(12) United States Patent
Kamlage

(10) Patent No.: US 11,839,196 B2
(45) Date of Patent: Dec. 12, 2023

(54) TRANSPORT SYSTEM FOR AN ANIMAL TO BE RECEIVED IN A MOTOR VEHICLE

(71) Applicant: GLT&I e.K., Odenthal (DE)

(72) Inventor: Karl-Heinz Kamlage, Odenthal (DE)

(73) Assignee: GLT&I e.K., Odenthal (DE)

( * ) Notice: Subject to any disclaimer, the term of this patent is extended or adjusted under 35 U.S.C. 154(b) by 30 days.

(21) Appl. No.: 17/053,736

(22) PCT Filed: May 6, 2019

(86) PCT No.: PCT/EP2019/061597
§ 371 (c)(1),
(2) Date: Nov. 6, 2020

(87) PCT Pub. No.: WO2019/215106
PCT Pub. Date: Nov. 14, 2019

(65) Prior Publication Data
US 2021/0259198 A1 Aug. 26, 2021

(30) Foreign Application Priority Data
May 7, 2018 (DE) .......................... 102018110933.4

(51) Int. Cl.
*A01K 1/02* (2006.01)
*B60P 3/04* (2006.01)
*B60P 1/43* (2006.01)

(52) U.S. Cl.
CPC .......... *A01K 1/0272* (2013.01); *A01K 1/0245* (2013.01); *B60P 3/04* (2013.01); *B60P 1/43* (2013.01)

(58) Field of Classification Search
CPC ....... A01K 1/0245; A01K 1/0272; B60P 3/04; B60P 1/43; F16C 1/10; F16C 1/106;
(Continued)

(56) References Cited

U.S. PATENT DOCUMENTS 2,897,781 A 8/1959 Olson
3,195,506 A * 7/1965 Beard ...................... B65D 7/26
217/15

(Continued)

FOREIGN PATENT DOCUMENTS

CN 101487374 A 7/2009
CN 101610953 A 12/2009
(Continued)

OTHER PUBLICATIONS

CN Appln. 201980045223.0, First Office Action (translation), dated Jan. 26, 2022, 27 pg.
(Continued)

*Primary Examiner* — Tien Q Dinh
*Assistant Examiner* — Katelyn T Truong
(74) *Attorney, Agent, or Firm* — CUENOT, FORSYTHE & KIM, L.L.C.

(57) ABSTRACT

A transport system for an animal to be received in a motor vehicle. The transport system comprises a carrier configured to be received on a transport surface of the motor vehicle and a boarding aid including a first tread element and at least a second tread element. The first tread element can be swivelably attached to the carrier, wherein the boarding aid is movable from a transport position to a boarding position. The boarding aid can be arranged in the transport position on a first side of a plane defined by the carrier, and the boarding aid is an obstacle for the animal after the transport system has been received in the motor vehicle. The boarding aid can be arranged in the boarding position on a second side of the plane defined by the carrier and the animal is able leave the motor vehicle via the boarding aid.

16 Claims, 16 Drawing Sheets

(58) Field of Classification Search
CPC .......... A61G 3/02; A61G 3/0218; A61G 3/06;
A61G 3/061; B64C 1/24
See application file for complete search history.

(56) References Cited

U.S. PATENT DOCUMENTS

| | | | | |
|---|---|---|---|---|
| 3,270,898 | A * | 9/1966 | Kuipers | E04H 6/065 |
| | | | | 187/212 |
| 4,546,728 | A | 10/1985 | May | |
| 5,026,243 | A * | 6/1991 | Dell | B65G 69/30 |
| | | | | 224/538 |
| 5,323,921 | A * | 6/1994 | Olsson | B65D 45/24 |
| | | | | 220/6 |
| 5,497,729 | A * | 3/1996 | Lord | A01K 1/0218 |
| | | | | 119/513 |
| 5,941,342 | A | 8/1999 | Lee | |
| 6,119,634 | A * | 9/2000 | Myrick | A01K 13/00 |
| | | | | 119/847 |
| 7,861,458 | B2 * | 1/2011 | Apps | B65D 11/1833 |
| | | | | 220/254.1 |
| 7,913,651 | B1 * | 3/2011 | Schiebout | A01K 1/0272 |
| | | | | 119/482 |
| 8,235,008 | B2 | 8/2012 | Axelrod et al. | |
| 9,617,788 | B2 * | 4/2017 | Goodson | E06C 1/005 |
| 9,832,968 | B2 * | 12/2017 | Jakubowski | A01K 1/035 |
| 10,085,417 | B2 * | 10/2018 | Miller | A01K 1/0353 |
| 10,098,314 | B2 * | 10/2018 | Murray | A01K 1/0272 |
| 10,856,519 | B2 * | 12/2020 | Volin | B60R 3/02 |
| 2005/0166862 | A1 | 8/2005 | Sanford et al. | |
| 2007/0084410 | A1 * | 4/2007 | Hain | A01K 1/0272 |
| | | | | 119/28.5 |
| 2008/0184502 | A1 * | 8/2008 | Roberts | A61G 3/061 |
| | | | | 14/71.1 |
| 2009/0038558 | A1 * | 2/2009 | Schulte | A01K 1/0245 |
| | | | | 119/496 |
| 2009/0126638 | A1 | 5/2009 | Bennett | |
| 2009/0188444 | A1 | 7/2009 | Whalen | |
| 2014/0119863 | A1 * | 5/2014 | Hill | B60P 1/43 |
| | | | | 414/537 |
| 2017/0088372 | A1 * | 3/2017 | Breeden, III | B65G 69/30 |
| 2018/0105091 | A1 * | 4/2018 | Stevens | B60P 3/04 |
| 2018/0334071 | A1 * | 11/2018 | Stojkovic | B60P 1/43 |
| 2018/0334198 | A1 * | 11/2018 | Hemphill | B60R 3/02 |
| 2019/0037799 | A1 * | 2/2019 | Murray | A01K 1/0272 |
| 2019/0150400 | A1 * | 5/2019 | Kumar | B65G 69/30 |
| 2019/0337438 | A1 * | 11/2019 | Keck | B65G 67/00 |
| 2020/0180494 | A1 * | 6/2020 | Perotti | B60P 1/43 |

FOREIGN PATENT DOCUMENTS

| | | | |
|---|---|---|---|
| CN | 202413566 U | | 9/2012 |
| CN | 203814345 U | | 9/2014 |
| CN | 205455198 U | | 8/2016 |
| CN | 106954553 A | | 7/2017 |
| CN | 206327260 U | | 7/2017 |
| CN | 107738603 A | | 2/2018 |
| DE | 202007016304 U1 | | 3/2008 |
| DE | 102010017184 A1 | | 12/2011 |
| DE | 202014006782 U1 | | 9/2014 |
| GB | 863013 A | * | 3/1961 |
| GB | 2490909 A | | 11/2012 |
| WO | 2019215106 A1 | | 11/2019 |

OTHER PUBLICATIONS

WIPO Appln. PCT/EP2019/061597, Notification of Transmittal of Translated International Preliminary Report on Patentability, dated Nov. 10, 2020, 1 pg.
WIPO Appln. PCT/EP2019/061597, International Preliminary Report on Patentability, dated Nov. 10, 2020, 8 pg., (Translated).
WIPO Appln. PCT/EP2019/061597, International Search Report, dated Jul. 25, 2019, 7 pg.
WIPO Appln. PCT/EP2019/061597, Written Opinion, dated Nov. 14, 2019, 8 pg.
DE Appln. No. 102018110933.4, Search Report, dated Mar. 14, 2019, 10 pg.

* cited by examiner

TRANSPORT SYSTEM FOR AN ANIMAL TO BE RECEIVED IN A MOTOR VEHICLE

CROSS-REFERENCE TO RELATED APPLICATIONS

This application claims the benefit of Germany Application Number 10 2018 110 933.4 filed on May 7, 2018 and International Application PCT/EP2019/061597 filed on May 6, 2019, which are fully incorporated herein by reference.

BACKGROUND

The present invention relates to a transport system for an animal to be received in a motor vehicle.

Transport boxes for pets, in particular for dogs, to be received in motor vehicles are known in various ways from the state of the art. Nevertheless, the known transport boxes fail to meet the requirements actually imposed on them with respect to the safety and wellbeing of the animal during the transport and the handling by the animal keeper when the animal boards and exits the vehicle.

SUMMARY

A transport system for an animal to be received in a motor vehicle. The transport system can include a carrier configured to be received on a transport surface of the motor vehicle and a boarding aid comprising a first tread element and at least a second tread element, the first tread element swivelably attached to the carrier, wherein the boarding aid is movable from a transport position to a boarding position. The boarding aid can be arranged in the transport position on a first side of a plane defined by the carrier, and the boarding aid can be an obstacle for the animal after the transport system has been received in the motor vehicle. The boarding aid can be arranged in the boarding position on a second side of the plane defined by the carrier and the animal can be able leave the motor vehicle via the boarding aid. The first tread element and the second tread element can be moveable relative to each other between an extended condition and a stowed condition. Swiveling of the boarding aid relative to the carrier from the transport position to the boarding position can provide a movement of the first tread element relative to the second tread element from the stowed condition to the extended condition.

A motor vehicle includes a transport system for an animal, the transport system received on a transport surface of the motor vehicle. The transport system can include a carrier configured to be received on a transport surface of the motor vehicle and a boarding aid comprising a first tread element and at least a second tread element, the first tread element swivelably attached to the carrier, wherein the boarding aid is movable from a transport position to a boarding position. The boarding aid can be arranged in the transport position on a first side of a plane defined by the carrier, and the boarding aid can be an obstacle for the animal after the transport system has been received in the motor vehicle. The boarding aid can be arranged in the boarding position on a second side of the plane defined by the carrier and the animal can be able leave the motor vehicle via the boarding aid. The first tread element and the second tread element can be moveable relative to each other between an extended condition and a stowed condition. Swiveling of the boarding aid relative to the carrier from the transport position to the boarding position can provide a movement of the first tread element relative to the second tread element from the stowed condition to the extended condition.

This Summary section is provided merely to introduce certain concepts and not to identify any key or essential features of the claimed subject matter. Other features of the inventive arrangements will be apparent from the accompanying drawings and from the following detailed description.

DETAILED DESCRIPTION

Figure 1:
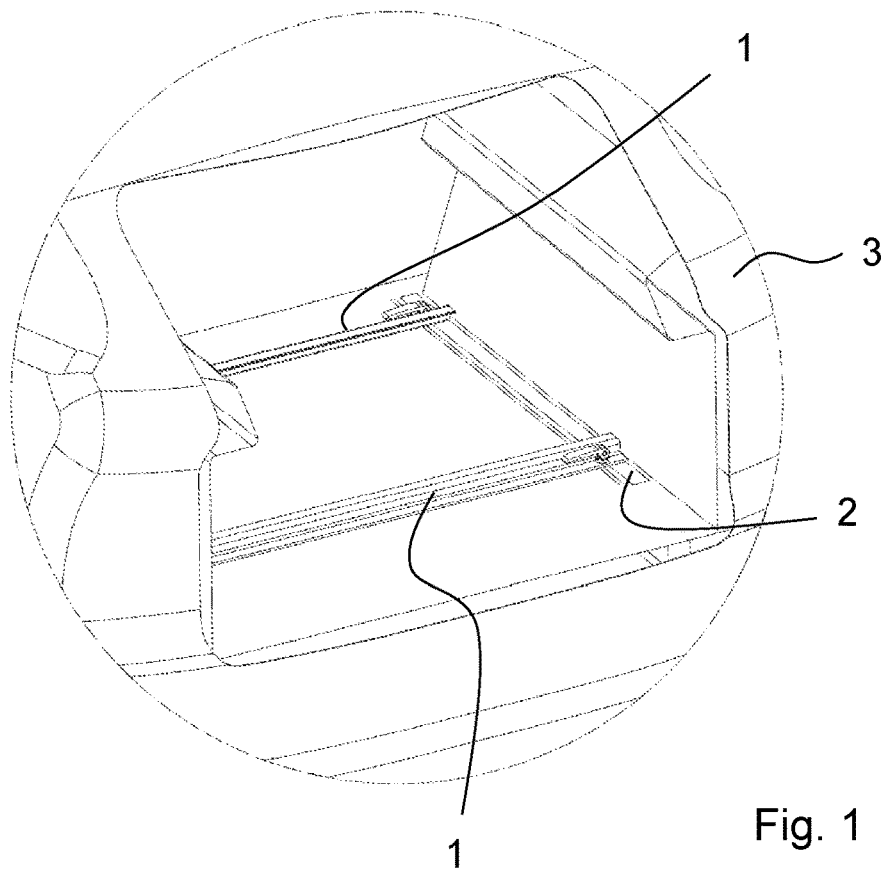
FIG. 1 is a partial isometric view of a trunk of a motor vehicle with two carriers.

The present invention relates to a transport system for an animal to be received in a motor vehicle.

Transport boxes for pets, in particular for dogs, to be received in motor vehicles are known in various ways from the state of the art. Nevertheless, the known transport boxes fail to meet the requirements actually imposed on them with respect to the safety and wellbeing of the animal during the transport and the handling by the animal keeper when the animal boards and exits the vehicle.

Therefore, the present invention is designed for providing a transport system for an animal to be received in a motor vehicle to allow the animal a simple boarding and exiting from the motor vehicle. In addition, the present invention is designed to provide a transport system which protects an animal sufficiently during transport in case of possible accidents, and in which the animal feels welcome. Furthermore, it is to make possible for the invention-related transport system to be installed into the motor vehicle simply and quickly. Contrary to the present state of the art, it is to allow particularly the user to handle the transport system simply and with a minimum of physical effort while the animal boards and exits the vehicle.

At least one of the above mentioned functions has been solved by a transport system for an animal to be received in a motor vehicle, with the transport system having a receivable carrier and boarding aid on a transport surface of the motor vehicle and a boarding aid, with the boarding aid at least comprising a first and a second tread element, with the first tread element being swiveled to the carrier and swiveling in such a way that the boarding aid can move from a transport position to a boarding position, with the boarding aid arranged in the transport position on a plane defined by the carrier so that, if the transport system has been received in the motor vehicle, the boarding aid is a blockade for the animal, with the boarding aid in the boarding position being arranged on a second side of a plane defined by the carrier so that, when the transport system has been received in the motor vehicle, the animal may leave the motor vehicle via the boarding aid, with the first tread element being connected to the second tread element in such a way that the first tread element and the second tread element can move relatively to each other between an extended condition and a stowed condition, with the first tread element and the second tread element being mechanically coupled in such a way that a swiveling of the boarding aid relative to the carrier from its transport position to its boarding position results in a movement of the first tread element with respect to the second tread element from the stowed condition to the extended condition.

In its minimum configuration, the invention-related transport system consists of a carrier to be received by the transport surface of the motor vehicle and a boarding aid mounted to this carrier in a swiveling-coupled or swiveling-mounted manner. To this effect, the transport surface of the motor vehicle may e.g. be the trunk surface, a load floor or the rear seat of the motor vehicle. A carrier is a member that can be connected to the motor vehicle in one embodiment.

Preference is given to an embodiment in which the carrier has a fastening device for connecting the carrier, in particular for a positive connection of the carrier to the reception of the motor vehicle as a complement to the fastening device. It is essential that the reception of the motor vehicle is firmly connected to the motor vehicle, preferably to the loading point of the vehicle at least in one embodiment.

An example of a suitable position for a form fitting reception of the fastening device of the carrier on the vehicle is a loading space rail as typically provided in the trunk of station wagons, vans, SUVs and other motor vehicles. Therefore, the fastening device is a slot nut or a square nut for a placement in the loading space rail in one embodiment of the invention. A lashing or loading space eyelet in the trunk or on a load floor is also suitable as a positive reception for the fastening device of the carrier to the motor vehicle. In such an embodiment of the invention, the fastening device on the carrier is e.g. a hook or a suitable tensioning device. Another example of such a reception of a motor vehicle is the Isofix reception point for child seats on the rear seat bench of a motor vehicle. In this embodiment, the fastening device of the carrier is then a corresponding hook that can be connected to the Isofix reception. It goes without saying that this can be secured in this embodiment, with the eye of the hook being closed.

A boarding aid with its tread elements according to the present invention is designed to grant the animal access to the transport surface of the motor vehicle, forming a catwalk or even stairs so that the animal can cope with the level difference between the ground, e.g. the asphalt pavement of a road and the level of the transport surface of the motor vehicle. It its understood that an embodiment of the tread elements of the boarding aid is always adapted to the distance between the transport surface and the ground on which the motor vehicle stands.

The first tread element is swiveled to the carrier in a swiveling manner so that it can be swiveled from its boarding position to its transport position, i.e. after the boarding or exit of the animal. Thus, a door, hatchback or platform gate of the motor vehicle can be closed without being obstructed by the boarding aid. During this swiveling movement of the boarding aid it is swiveled from one side of a plane defined by the carrier to the other side of this plane. To this effect, it is for the present invention sufficient if the carrier determines one of the straight lines defining the plane. In an embodiment in which the carrier has already been received on the transport surface of the motor vehicle, the plane to be considered is slightly above the transport surface of the motor vehicle.

It is essential for the function of the invention-related transport system that the boarding aid in its transport position is an obstacle for the animal whenever the transport system has been received on the transport surface of the motor vehicle. In this way the door, hatchback or platform gate of the motor vehicle can be opened by the user with only one hand without any danger that the animal immediately jumps onto the street. Conversely, the obstacle formed by the boarding aid in its transport position prevents the animal from being injured by the door, when the hatchback or the platform gate is closed.

In one embodiment of the invention, the boarding aid has a first locking device on at least the first or the second tread element, engaging into a second locking device which is a complement to the first locking device, in the transport position of the boarding aid. To this effect, an embodiment of the invention has the second locking device arranged on one of the side walls of the invention-related transport system. An example for the first locking device is a journal which can be moved by a locking lug of the second locking device.

A one piece boarding aid, which can equalize the level difference between the transport surface of the motor vehicle and the ground by a single element, could hardly be received even in large motor vehicles because of the lack of sufficient stowing space. Therefore, the invention-related transport system has a boarding aid with at least a first and a second tread element, with the tread elements movable to each other between an extended condition and a stowed condition. It goes without saying that the stowed condition is achieved with a low overall length in the transport position of the boarding aid, while the extended position in the boarding position of the boarding aid is achieved. It goes without saying that the boarding aid may basically consist of more than two tread elements, with the majority of the tread elements being movable to one another so that the tread elements may change between an extended condition and a stowed condition.

It is essential for the practical use of the boarding aid that the first tread element and the second tread element are not only movable to each other between the extended condition and the stowed condition but that there is a mechanical coupling between the first tread element and the second tread element so that a swiveling of the boarding aid relative to the carrier leads to a movement of the first tread element relative to the second tread element from the stowed condition to the extended condition. Such a coupling allows single-hand control of the boarding aid. This is an advantage in that the swiveling movement of the boarding aid from its transport position to its boarding position removes the obstacle for the animal so that it can leave the transport surface of the motor vehicle. In such a moment it is useful if the animal can e.g. be kept on the leash. However, the user must have one hand free for that. This is ensured by the single-hand control according to the present invention.

To this effect, the coupling of the first tread element to the second tread element can be effected in entirely different ways. In an embodiment of the invention, the user takes hold of the first tread element and swivels it relative to the carrier. Coupling means then that the swiveling movement of the first tread element relative to the carrier causes the first tread element and the second tread element to move to one another. As an alternative to this, the user takes hold of the second tread element and swivels the first and the second tread element relative to the carrier in one embodiment, while this swiveling movement relative to the carrier leads to the movement of the first tread element relative to the second tread element from the stowed condition to the extended condition, i.e. in particular to a swiveling of the first tread element relative to the second tread element from the folded to the extended condition in one embodiment.

In one embodiment of the invention, the first tread element and the second tread element can be moved relative to each other by a telescopic control so that they can be moved relative to each other from the extended condition to the stowed condition and vice versa.

In an alternative embodiment of the invention, the first tread element and the second tread element can be swiveled relative to one another.

However, in a preferred embodiment, the first tread element is attached to the second tread element in a swiveling fashion so that the first tread element and the second tread element can be swiveled one to another between an extended condition and a folded condition, with the first tread element and the second tread element mechanically coupled in such a way that a swiveling of the boarding aid relative to the carrier from its transport position to its boarding condition causes the first tread element to swivel relative to the second tread element from the stowed condition to an extended condition.

It goes without saying that the folded condition of the first tread element and the second tread element, if interconnected pivotably, corresponds to the condition of the first and second tread element, generally described as a stowed condition.

In an embodiment the boarding aid has a pivot axis around which the first tread element can be swiveled relative to the second tread element, and has a handle element, with the handle element attached on the pivot axis in a pivotable manner relative to the first tread element and the handle element rigidly connected to the second tread element. An attachment of the handle element to the pivot axis is in such a way that it is rigid, i.e. it can be swiveled at a fixed angle position relative to the second tread element and relative to the first tread element to allow a coupled swiveling movement of the first tread element relative to the carrier and the second tread element relative to the first tread element. Single-hand control is possible.

In another embodiment such a handle element has mainly a U-shape with a first leg, a second leg and a connection section connecting the first and the second leg, with the first leg pivotably linked to the pivot axis and the second leg rigidly connected to the second tread element. In this way, a rigid attachment, which cannot swivel relative to the second tread element, can be realized in a simple way.

In another embodiment of the invention, the pivot axis is arranged in a plane between the first and the second tread element in a folded condition of the first and second tread element. This means in other words that the pivot axis protrudes relative to the planes defined by the first and the second tread element, which again means a reduction in the torques required during the swiveling of the tread elements relative to each other and the tread elements relative to the carrier.

In another embodiment of the invention the boarding aid has a stand, with the stand pivotably attached to the second tread element in a swiveling manner from an unfolded to a folded position (and vice versa), with the stand in the folded position mainly extending parallel to the second tread element. Such a stand makes it possible to support the tread element in its boarding position on the ground so that the stand intercepts the torques occurring due to the dead weight of the boarding aid as well as the animal running over the boarding aid.

In an embodiment of the invention the boarding aid has exactly one stand which is preferably arranged in the middle of the width of the second tread element. Such a design is advantageous in that the boarding aid always stands firmly in its boarding position without tilting.

It goes without saying that the stand in one embodiment defines a distance of a lower end of a second tread element in the built-in condition of the transport system to the ground. In an embodiment of the invention the length of the stand can variably be adjusted and can thus be adapted to the different levels of transport surfaces of motor vehicles.

In another embodiment of the invention, the stand is coupled to the first and/or second tread element in such a way that a swiveling movement of the first and/or second tread element leads to a swiveling movement of the stand. In an embodiment of the transport system, the stand is preloaded in its unfolded position by a spring which is supported by the second tread element. In other words, the stand can only be brought to its folded position against the spring force.

The swiveling movement of the stand relative to the second tread element can either be coupled to a swiveling movement of the first and/or second tread element and the second tread element relative to each other or to a swiveling movement of the first tread element relative to the carrier.

In an embodiment of the invention, the swiveling movement of the stand is coupled to the swiveling movement of the first tread element and the second tread element relative to each other. In one embodiment this coupling is mechanically implemented by a non-rotatable roll relative to the first tread element which is concentrically mounted on the pivot axis of the swiveling movement of the first tread element relative to the second tread element, and by a second non-rotatable roll mounted to the stand with the second roll concentrically mounted around the pivot axis of the stand relative to the second tread element. To this effect, the Bowden cable is mounted to each of the two rolls. The Bowden cable is mounted to the first and the second roll in such a way that a swiveling movement of the first tread element on the second tread element exerts a tension on the second end of the Bowden cable which is fastened to the second roll, leading to a retraction of the stand from the unfolded position to the folded position.

If in such an implementation the stand is additionally preloaded by means of a spring, e.g. a gas pressure spring, in its unfolded position relative to the second tread element, the described coupling of the swiveling movement of the first and the second tread element relative to each other and the stand relative to the second tread element also provides force support during the swiveling of the boarding aid from its transport position to its boarding position.

If an alternative embodiment of the invention the stand is preloaded by a spring relative to the second tread element in its folded position. However, force has to be exerted relative to the force of the spring when the boarding aid is moved from its transport position to its boarding position. However, the spring of this type drives the swiveling movement from the boarding position to the transport position when the boarding aid is moved, thus supporting the user against the gravity during the swiveling movement.

In one embodiment of the invention, the Bowden cable has been inserted in the material of the second tread element so that it is not visible from the outside, at least sectionally.

In an alternative embodiment the stand is mechanically coupled by means of a chain or belt or a shaft drive to the first and/or the second tread element in such a way that a swiveling movement of the first and/or second tread element leads to a swiveling movement of the stand.

In still another alternative embodiment, the stand is driven by an electric, hydraulic or pneumatic actuator and can be swiveled from the folded to the unfolded position and vice versa. The control system of the actuator has a sensor which detects the swiveling movement of the first tread element relative to the carrier or movement of the second tread element relative to the first tread element and controls the movement of the stand as a function of the detected movement. The coupling of the movement of the stand is therefore preferably electrically coupled to the movement of the tread elements in such an embodiment.

In another embodiment of the invention-related transport system the first tread element and the second tread element form a stop on their facing ends, i.e. in the area of the pivot axis between the tread elements. This stop limits the swiveling movement as soon as the first tread element and the second tread element have reached their extended condition. To this effect, the end of the first tread element opposite the carrier has an L-shape in one embodiment of the invention, with a leg of this L covering a section of the second tread element in its extended condition.

While a number of materials seem basically to be suitable for forming the first and the second tread element, single-hand control is only possible if the forces required are sufficiently low for transferring the boarding aid from its transport position to its boarding position and vice versa. In one embodiment of the invention-related transport system, the first and/or the second tread element, but preferably both tread elements, are made of a composite fiber material, preferably a composite fiber and plastic compound.

The configuration of the composite fiber materials allows a targeted reinforcement of those sections of the tread elements to which the largest forces and moments are transferred. To strengthen the material, the alignment of the fibers as well as the number of the layer of fibers can be varied.

In one embodiment of the invention those areas of the first and second tread elements to which the pivot axis for the swiveling movement between both tread elements is attached, are reinforced. In another embodiment of the invention, the area of the first tread element in which this tread element is linked to the pivot axis for the swiveling movement between the carrier and the first tread element has a reinforced shape. Another area in which the embodiment has a reinforced shape is the area where the stand is fastened to the second tread element. In an embodiment of the invention, a fastening section which supports the pivot axis for the swiveling movement of the stand is inserted positively in the composite materials. Especially in this area it is necessary to transfer the loads generated by a stress on the right and left side of the stand in the form of torques into the material without any delamination. In addition, the material of the tread element must not be twisted by the weight of the animal on the left and right side of the stand. To achieve stability against torsion, the diagonal forces in the layer structure of the composite fiber material must be considered.

In an embodiment of the invention, the composite fiber material is an aramid fiber reinforced plastic (AFRP), with the fiber material being an aramid, Kevlar for example. In another embodiment, the composite fiber compound is carbon fiber reinforced plastic (CFRP). In still another embodiment, the fiber-plastic compound is a mixed form of AFRP and CFRP. Such a mixed form is advantageous in that e.g. CFRP is very solid but tends to splinter in case of an accident. If the CFRP is laminated with an AFRP on the outside; a better safety relative to splinter can therefore be provided in case of an accident.

In another embodiment the material of the first and/or second tread element is sandwich material, with a filling between two cover layers of composite fiber material, e.g. in the form a honeycomb or a foam structure.

Since composite fiber materials normally have a very hard but typically smooth surface, they are not or only conditionally suitable for the treading of an animal, in particular a pet. In one embodiment the first and/or the second tread element is therefore at least sectionally coated with an elastically deformable plastic so that the first and/or the second tread element has a non-slip surface for the animal. In another embodiment the first and/or the second tread element are at least sectionally covered by plastic with slip retardant surface. In another embodiment, the first and/or the second tread element has a recess which at least sectionally extends over its surface. The upper side of the recess can accept, or has accepted, a molding which is coated or bonded by elastically deformable plastic. Thus, the molding and the deformable plastic is a non-slip element for the animal. In one embodiment the molding is made of composite fiber material, preferably another fiber-plastic composite. In one embodiment, the molding is screwed to the first or second tread element. Thanks to its design, the non-slip element is exchangeably attached to the particular tread element and may be replaced if required, in particular in case of wear of the elastically deformable plastic.

In one embodiment, the invention-related transport system has a rear wall arranged opposite the boarding aid and two side walls so that they form a transport space lining, preferably a trunk lining.

While the rear wall and the side walls which can be swiveled relative to the carrier and/or the ground are first regarded as an option for the invention-related transport system with its boarding aid, a transport system with a rear wall, two side walls and a floor as detailed below may be a separate invention, without the transport system necessarily having a boarding aid within the meaning of the present arrangements.

At least one of the above-mentioned items is also implemented according to the invention by a transport system for an animal to be received in a motor vehicle with a carrier receivable on a transport surface of the motor vehicle, a rear wall and two side walls, with the rear wall and/or the side walls positively and/or frictionally connected to the carrier.

The boarding aid is then optional for this invention. The designs of the carrier also result from the above-mentioned description of the embodiments of carrier. Designs of the rear wall and the side walls result from the following description of their embodiments. The embodiments of the rear wall and the side walls described below also correspond to designs of the invention.

In one embodiment of the inventions, the rear wall and/or the two side walls are connected to the carrier in a positive and/or frictional manner. In another embodiment of the inventions, the transport system also has a floor, with this one also positively or frictionally connected to the carrier. It goes without saying that even the floor serves for the design of the transport space lining or trunk lining. In one embodiment in which the transport system has a floor, with the rear wall and/or the side walls connected frictionally and/or positively to the floor and the floor again connected to the carrier frictionally, the rear wall and/or the side walls are deemed frictionally and/or positively connected to the carrier within the meaning of the present application.

In this connection the transport space lining is in particular open to the top, i.e. has no cover and is therefore not of the closed type but only provides protection for the side walls surrounding the transport surface and is an option the protection for the transport surface itself.

In one of the embodiments of the inventions where the transport system has a rear wall and two side walls, the rear wall and the side walls can be swiveled relative to the carrier, preferably relative to the carrier and the floor. In this way, the lining for the transport space can be folded, improving the handling of the invention-related transport system.

In one embodiment of one of the inventions the rear wall is pivotably connected to every side wall along a particular edge of it, with every side wall having at least two sections which can be swiveled relative to each other so that the rear wall and the side walls can be swiveled relative to one another and relative to the carrier and/or the floor and can be deposited on the carrier and/or the floor.

In this way, the rear wall and the side wall may be designed of a solid and rigid material and may e.g. not be of a textile fabric only, while the swivability and thus easy handling is nevertheless ensured.

For the swivability the sections of the side walls and the rear walls can be swiveled by means of turn-slide cylindric joints around the particular pivot axis in one of the embodiments of the inventions, with the turn-slide cylindric joints allowing a translatory motion of the sections of the side wall sections and the rear wall relative to the pivot axis, making a combined translatory movement and swiveling motion of the side wall sections and the rear wall to each other possible. It has turned out that pure hinge joints do not allow a comparatively complex folding of rigid walls since they lack the clearance required for swiveling movements.

In one embodiment of one of the inventions the rear wall can be swiveled by means of a combination of a first hinged joint and a second hinged joint relative to the carrier and/or the floor plate, with a swiveling of the first hinged joint effecting the displacement of the position of the pivot axis of the second hinged joint.

Basically, even aluminum, steel or wood are suitable materials for the rear wall and/or the side walls and/or the floor. However, in one the embodiment of the inventions the rear and/or the side walls are made of a highly impact proof and thus force distributing material. In particular, such material comprises composite fiber material, preferably a fiber-plastic composite. Basically, the same materials as used for the tread element of the boarding aid are suitable materials for the rear wall and/or the side walls and/or the floor. In particular, the structure of two bowls made of a composite fiber material with inserted foam as a core material in one embodiment of the invention.

If the vehicle collides with an obstacle, the unbelted animal would bounce relative to the rear wall or one of the side walls. The high impact strength of the material selected for the rear wall and/or side walls as well as its layer structure then effect a distribution of the force to be received and thus the energy to a significantly larger surface.

In another embodiment of one of the inventions, the rear wall has a majority of penetrations in an area at a distance from a hinge joint around which the rear wall can be swiveled relative to the carrier and/or the floor plate. Such a design of the rear wall of the transport system allows a user to view the transport area of the transport system and thus the animal in it as well as the rear traffic. Therefore, in an embodiment of the invention the rear wall has a larger height than the side walls so that the rear wall prevents the animal form leaving the trunk in the direction of the passenger space when the transport system is received in the trunk of the motor vehicle.

Also, the section of the rear wall provided with penetrations may have been made of a composite fiber material, preferably a fiber-plastic composite. To this effect, a frame defining the outer limit of the rear wall is wrapped with fiber composite filaments so that a grid like structure is created in one of the embodiments. Then, this forms a structure with penetrations in the upper area of the rear wall while the structure in the lower area of the rear wall can be closed by a top layer.

In another embodiment the transport system additionally has an energy absorption element meshed with a rear wall surface pointing away from the boarding aid. Such an energy absorption element serves as an energy absorber in the event of a motor vehicle crash and thus an inertial movement of the animal in the traveling direction of the motor vehicle.

The invention-related energy absorption element is an option for the transport system with its boarding aid according to the current arrangements but also for the transport system without any boarding aid as described in the embodiments of them before. However, the energy absorption element is a separate invention independent of the inventions described before. At least one of the above-mentioned tasks is therefore solved by a transport system for an animal to be received in a motor vehicle, having a carrier to be received on a transport surface of the motor vehicle and an energy absorption element for absorbing kinetic energy. The boarding aid and/or the rear wall and the side walls are then optional for this invention.

Designs of the carrier result from the above-mentioned description of the embodiments of the carrier. Designs of the rear wall and the side walls result from the following description of their embodiments. However, the embodiments of the energy absorption element described below are also embodiments of the invention.

In an embodiment the energy absorption element optionally consists of a plastically or elastically deformable material or a brittle material. In particular, a plastically deformable material or a brittle material has an advantage in that it allows an absorption of high energies. Particle foam is an example for such a plastically deformable material. The displacement of a gas or a liquid in an envelope filled with gas or liquid is also suitable for energy absorption.

It goes without saying that the energy absorption element or other energy absorption elements may additionally be meshed with the side walls of the transport system.

In one embodiment of the invention, the energy absorption element consists of a rear section extending mainly parallel to the rear seat back rest of the motor vehicle in a built-in condition, and of two side sections. Here, the rear section and the two side sections of the energy absorption element are designed in a swiveling manner to each other. The swivelability is realized by a foil hinge between each of the side sections and the rear section in one embodiment. In an embodiment of the invention, each of the pivot axes between the side sections and rear section have a different distance from a surface of the rear section. In this way the two side sections can basically be laid parallel one on the top the other on the rear section for saving space even if the individual sections have a considerable thickness.

The positive or frictional connection of the energy absorption element directly to the carrier or indirectly via an element arranged in between such as the floor of the trunk lining with the carrier is effected in an embodiment by means of a magnetic lock. To this effect, an embodiment of the invention has a permanent magnetic element such as a magnetic tape connected to the energy absorption element in it, which can be meshed with a carrier or another element by a ferromagnetic element, e.g. on the floor of the trunk lining. Another arrangement is also conceivable in which the energy absorption element has a ferromagnetic element while the carrier or floor has a permanent magnetic element.

At least one of the above mentioned problems can also be solved in embodiments of it as described before by a motor vehicle with a transport system received on a transport surface of the motor vehicle. To this effect, the carrier is positively connected to a loading space rail or a lashing eyelet arranged on the transport surface of the motor vehicle in an embodiment of the inventions. The lashing eye is the Isofix reception on the rear bench of the motor vehicle in an embodiment of the invention.

It goes without saying that the invention-related energy absorption element is particularly effective if it is arranged between the rear wall of the transport system and a seat backrest or a platform gate of the motor vehicle. In one embodiment of the invention in which the rear wall has a force distributing function, the energy absorption element can absorb energy best.

A carrier 1 which can be connected to the motor vehicle 3 positively and frictionally is the basis for the transport system according the present invention. In the shown type the carrier, as can clearly be seen in the FIGS. 1 to 4, is formed by a post and is alternatively connected to two loading space rails 2 or two lashing eyelets 58 of the motor vehicle 3.

Figure 2:
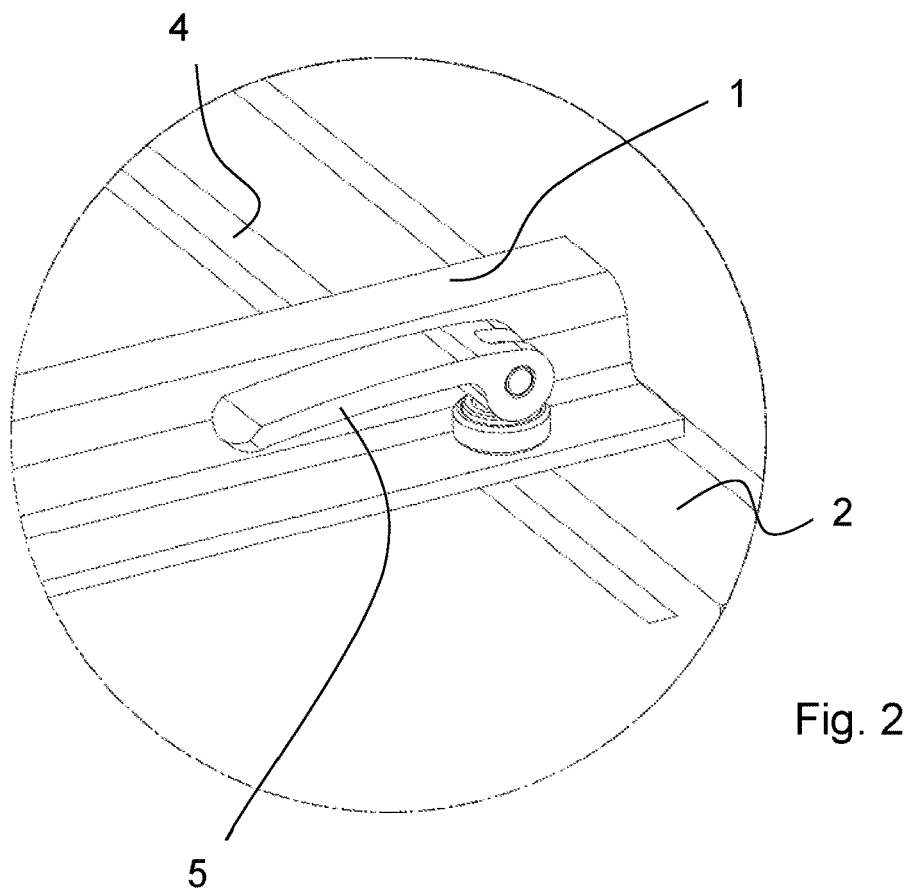
FIG. 2 is an enlarged and partially isometric view of the carrier from FIG. 1.

The type as shown in FIGS. 1 and 2 is post 1 every end of which is clamped by a slot nut (not shown) in groove 4 of the loading space rail 2, with the carrier 1 braced relative to loading space rail 2 by a quick activating device 5, and/or the slot nut and thus the carrier 1 is pressed relative to the loading space rail.

Figure 3:
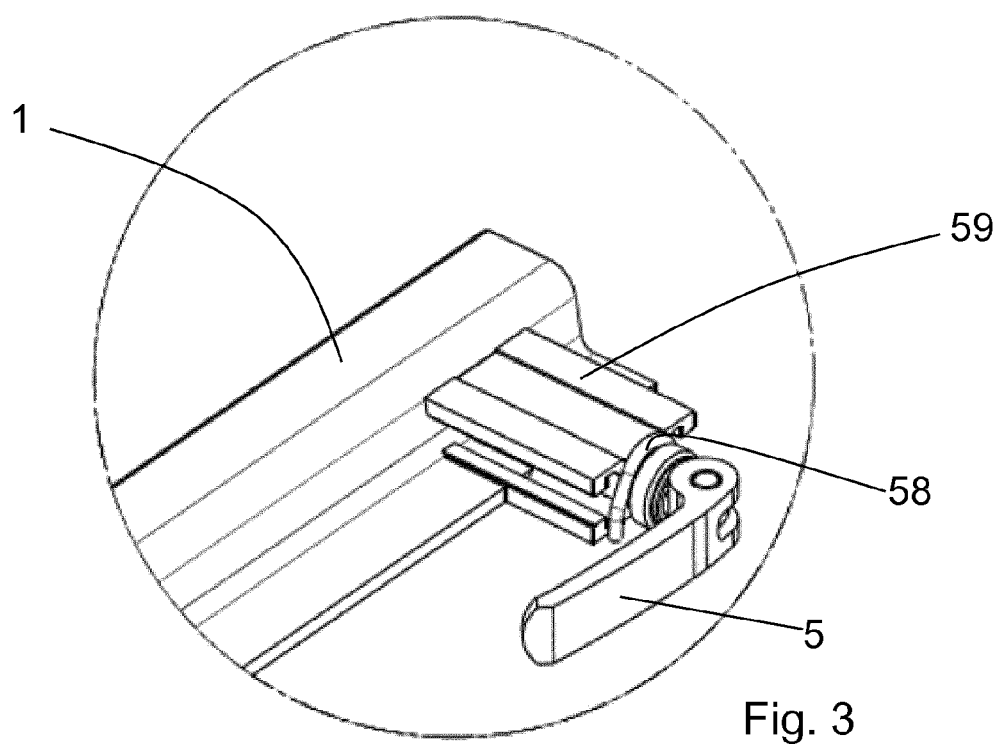
FIG. 3 is an enlarged and partially isometric view of an alternative carrier type.
Figure 4:
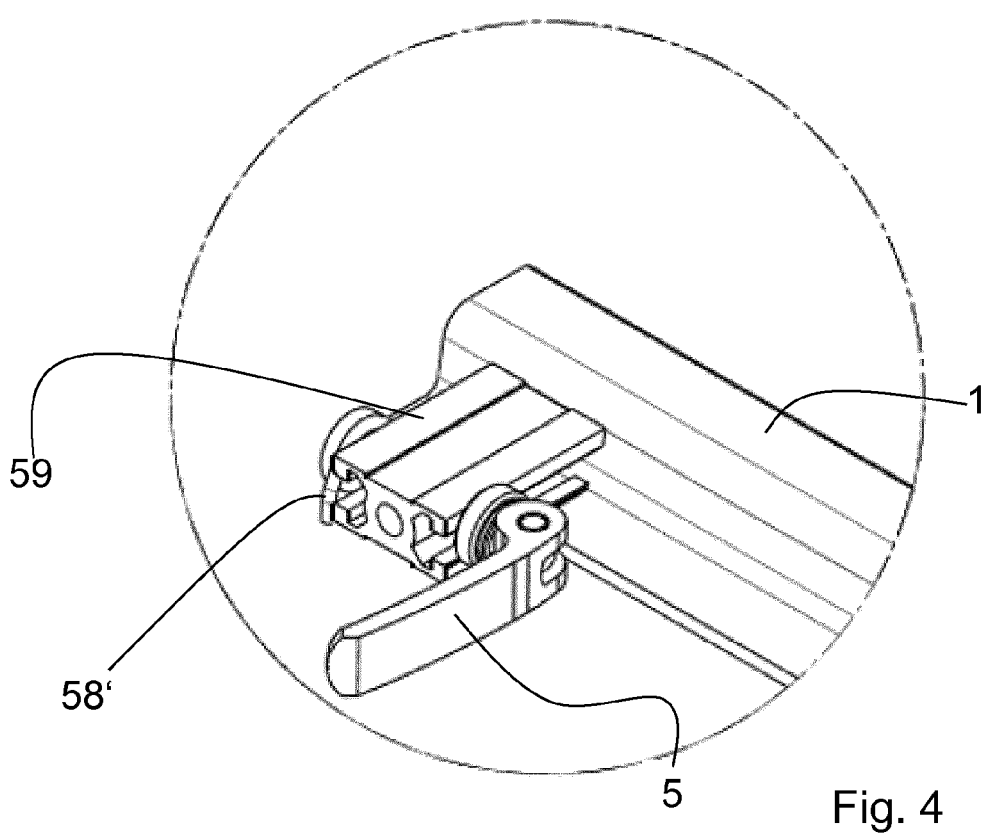
FIG. 4 is an enlarged and partially isometric view of another alternative carrier type.

In the types of FIGS. 2 and 3, post 1 is connected to motor vehicle 3 positively and frictionally by a pair of lashing eyelets 58, 58'. FIGS. 3 and 4 each only show the fastening of carrier 1 to one of the two lashing eyelets of the pair. For bracing carrier 1 with the lashing eyelet 58, 58' a quick acting device 5 is used again. It is connected via an adapter 59 to carrier 1 in the embodiments of FIGS. 3 and 4. The types of FIGS. 3 and 4 are distinguished by the direction of the lashing eyelets 58, 58' in the particular trunk of the motor vehicle 3. Given the mounting position of the carrier 1 shown in FIG. 1, the lashing eyelets 58 of type 2 from FIG. 3 are arranged in such a way that the eyes through which the axles of the quick acting device 5 are passed are vertically aligned to the travel direction of motor vehicle 3. Conversely, the eyes of the lashing eyelets 58' from FIG. 4 are aligned parallel to the travel direction of motor vehicle 3.

Carrier 1 serves for a positive and thus rigid and slip proof installation of the transport system, as described in detail below, in the trunk of motor vehicle 3. The boarding aid of the transport system may either be directly attached to carrier 1 or attached to elements which are connected to carrier 1. In both cases, the present application refers to the fact that the boarding aid or its first tread element is attached to the carrier in a swivable manner.

Carrier 1, as shown in FIGS. 1 to 4, is not only the basis for a transport system with a boarding aid but also for a transport system without any boarding aid to connect the side walls, the rear wall and optionally a floor of a transport space lining firmly to the motor vehicle by means of carrier 1'.

Figure 5:
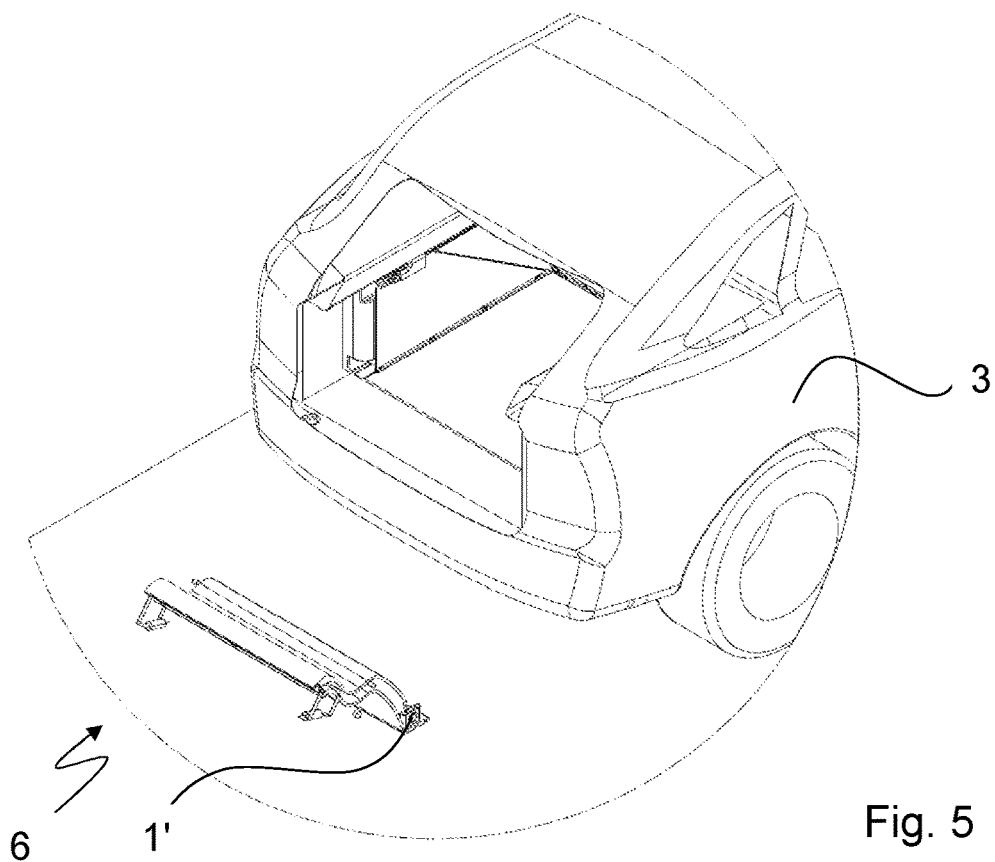
FIG. 5 is a partial isometric view of a boarding aid before the installation in the trunk of a motor vehicle.
Figure 6:
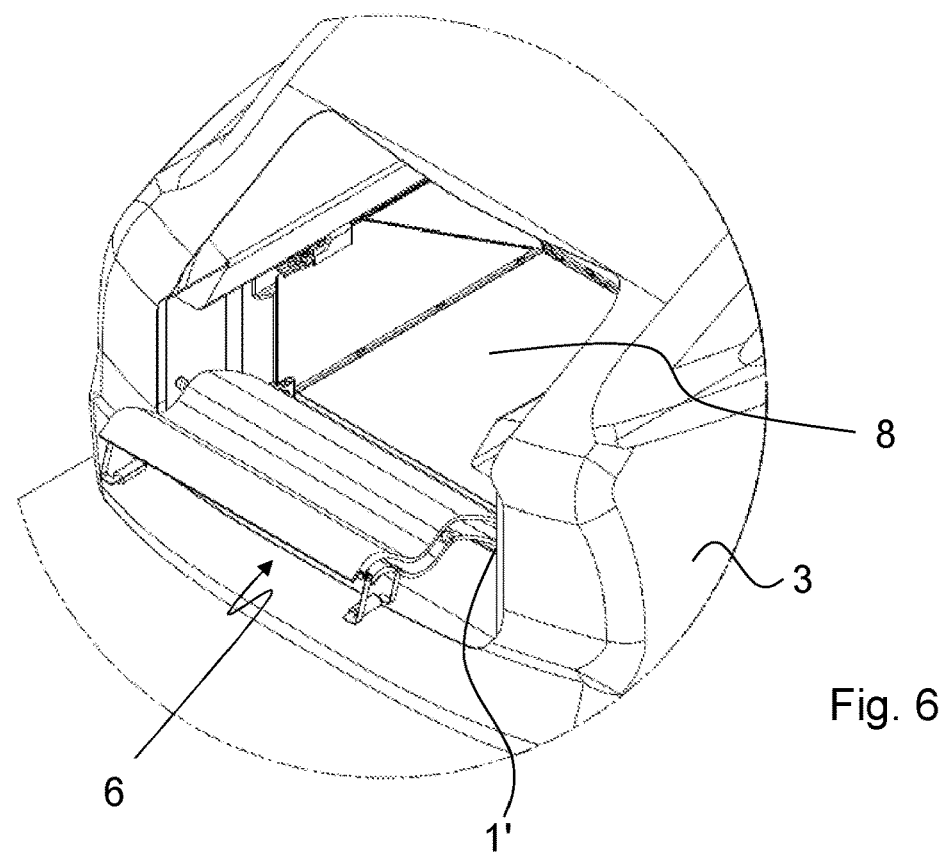
FIG. 6 is a partial isometric view of the boarding aid from FIG. 5 during the installation in the trunk.
Figure 7:
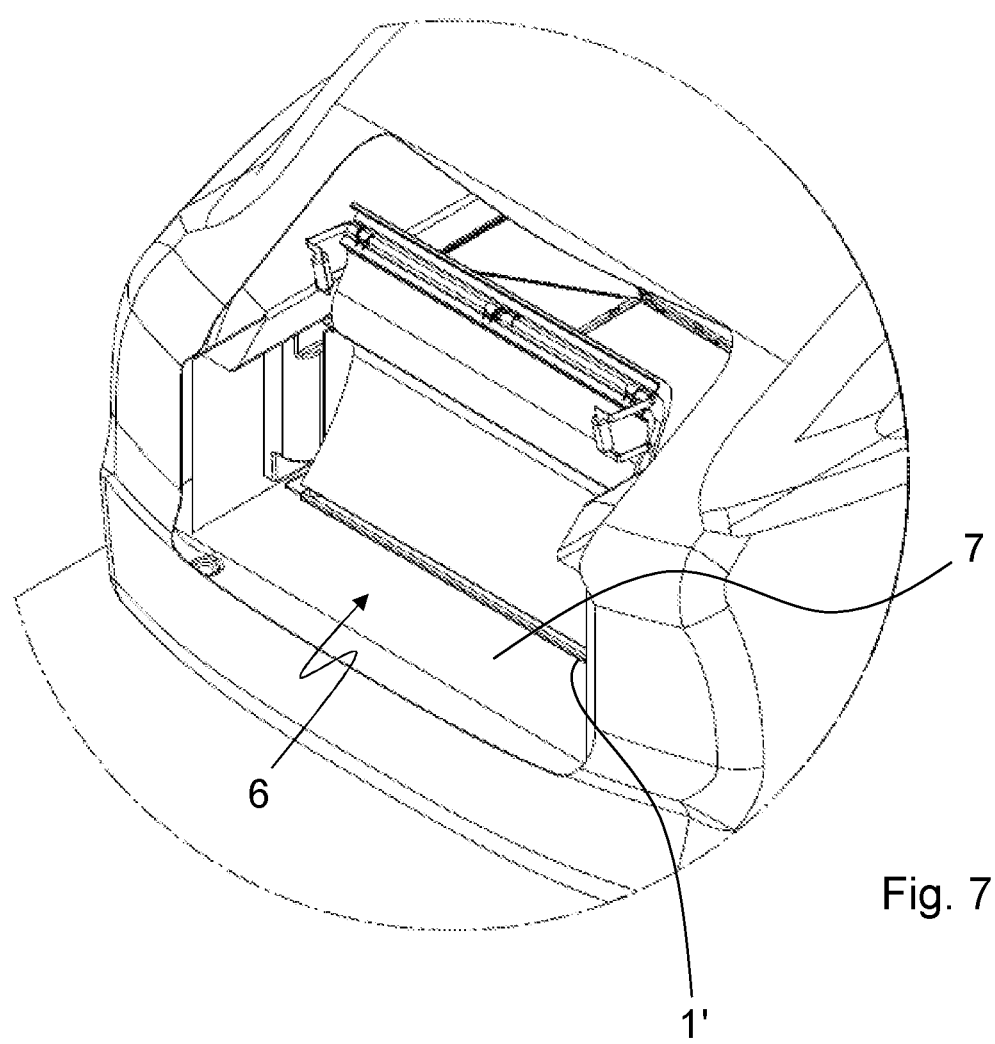
FIG. 7 is a partial isometric view of the boarding aid from FIGS. 5 and 7 in an installed condition in the trunk in its transport position.

FIG. 5 shows a carrier 1' with its boarding aid 6 in a still non-installed condition, lying in front of the trunk of a motor vehicle 3. FIGS. 6 and 7 show how carrier 1' with its boarding aid 6 is received in the trunk. As far as this is shown for carrier 1' from FIGS. 1 and 2, carrier 1' is braced with the loading space rails 4 in the trunk of motor vehicle 3.

FIG. 7 shows the carrier 1' with its boarding aid 6 in its transport position. FIG. 7 clearly shows that boarding aid 6 in its transport position is an obstacle for an animal received on the transport surface 7 of the motor vehicle or a floor 8 of the transport system, preventing the animal from leaving the trunk of the motor vehicle.

Figure 8:
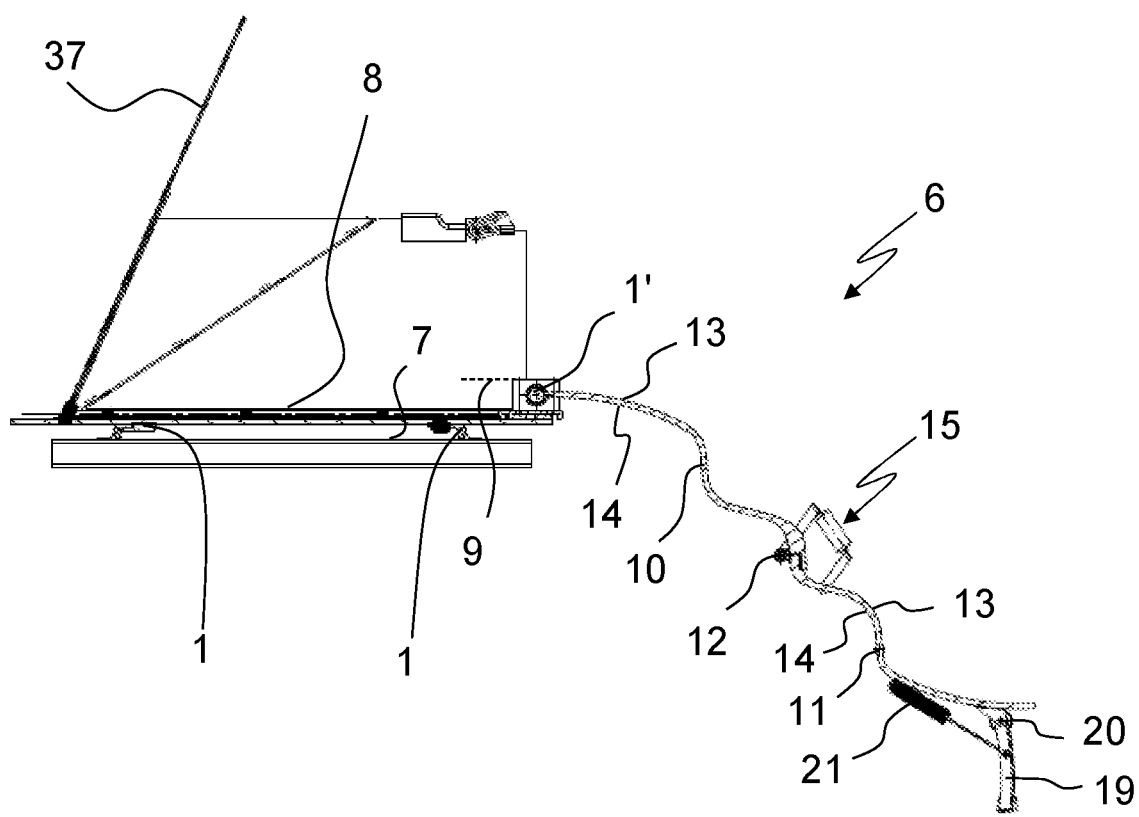
FIG. 8 is a partially schematic side view of the boarding aid from FIGS. 5 to 7 in its boarding position.

The side view of boarding aid 6 and carrier 1' in FIG. 8 shows boarding aid 6 in its boarding position. A synopsis of FIGS. 5 and 6 shows clearly that an imagined plane 9 which is defined by carrier 1' and a substantially by straight line parallel to the transport surface 7 of motor vehicle 3 and vertically extends to carrier 1' is somewhat above transport surface 7 due to the mounting position of carrier 1'. In the transport position, as shown in FIG. 7, there is a boarding aid 6 above this plane 9 and below the transport position as shown in FIG. 8.

The type shown for the boarding aid 6 comprises a first tread element 10 and a second tread element 11, which can be swiveled to one another around a pivot axis 12. In addition, the first tread element 10 is attached to the carrier 1' in a swiveling manner so that the boarding aid with the first tread element 10 and the second tread element 11 can be swiveled from the boarding position to the transport position and vice versa.

Figure 9:
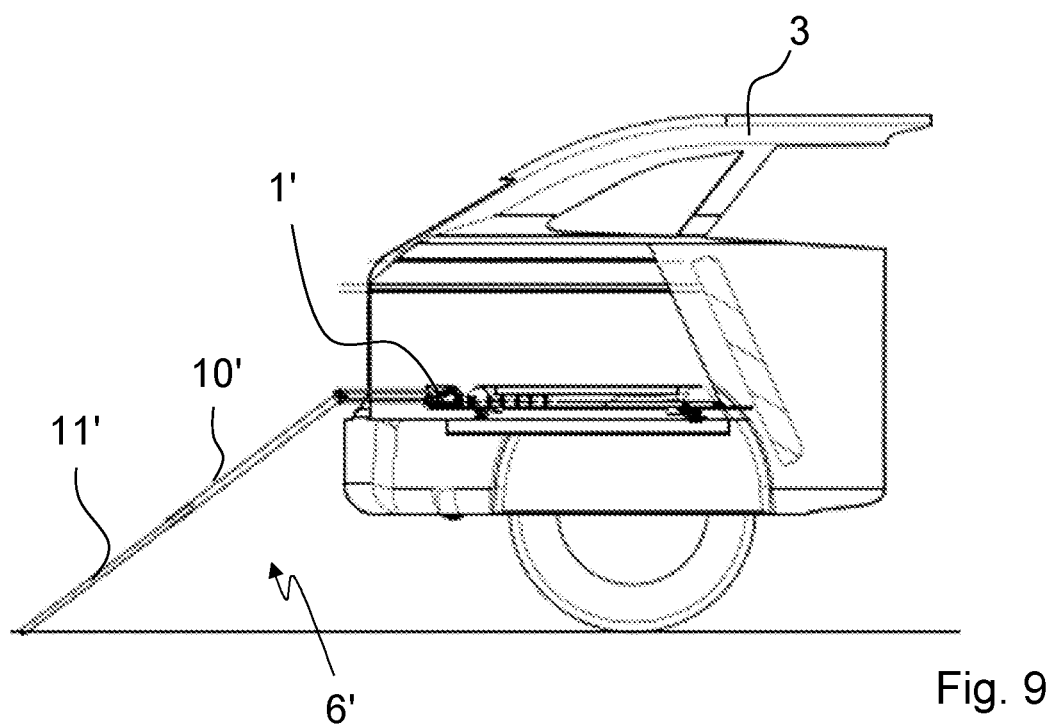
FIG. 9 is a schematic partially side view of an alternative boarding aid.

Regarding the boarding aid, the same invention-related idea can also be implemented alternatively with a boarding aid 6', as shown in FIG. 9. Boarding aid 6' consists of two supported first and second tread elements 10', 11' which can be moved relative to each other. Also, the link to the first tread element 10' on carrier 1' allows them to swivel from boarding position to the transport position and vice versa. This boarding aid 6' is also a blockade in the transport position for an animal received on the transport surface of the motor vehicle.

Figure 10:
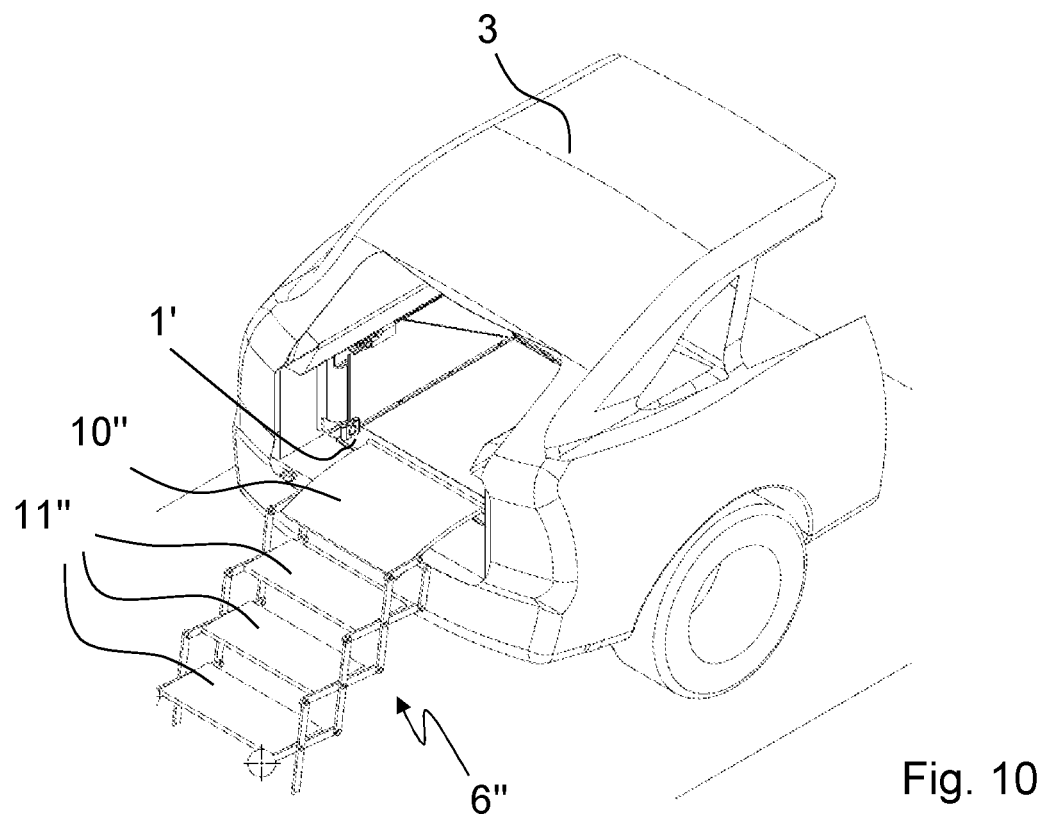
FIG. 10 is a schematic and partially isometric view of another alternative boarding aid.
Figure 11:
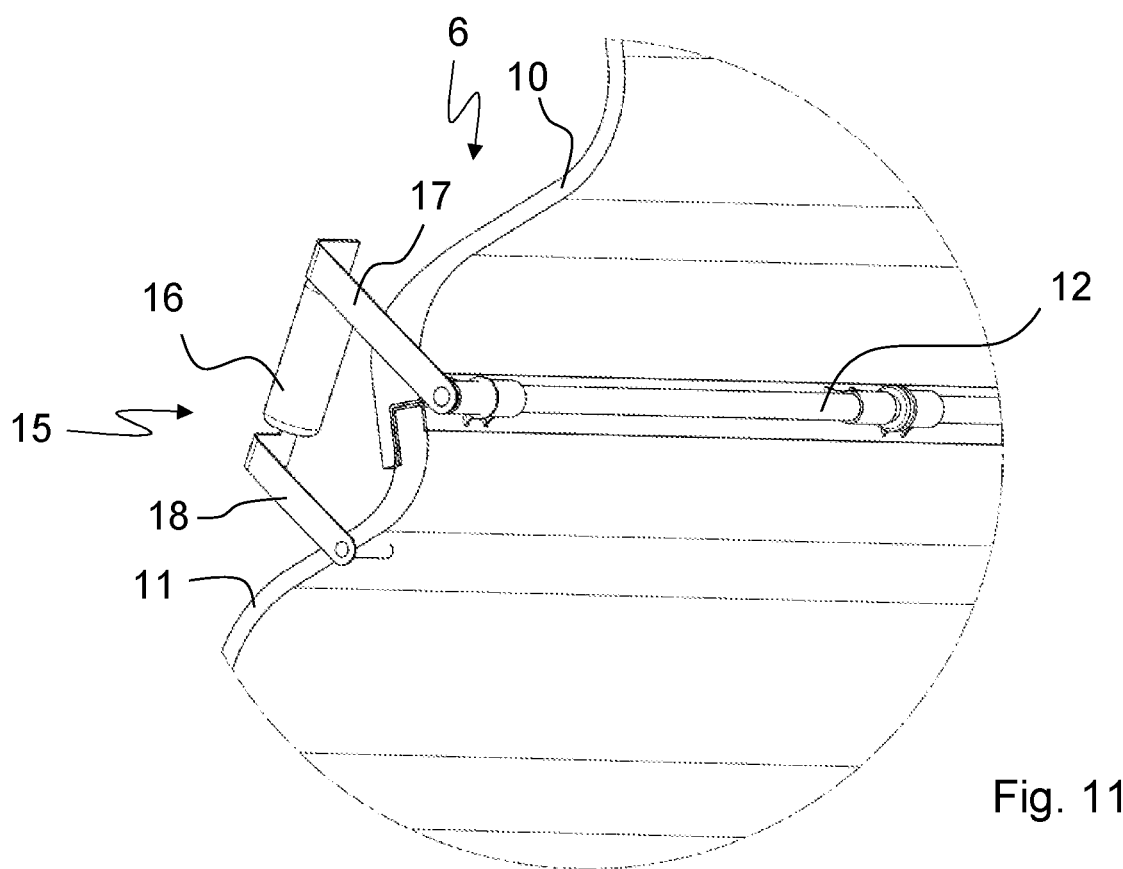
FIG. 11 is a partial isometric detailed view of the boarding aid from FIGS. 5-6.

FIG. 10 shows another alternative implementation of boarding aid 6" of the invention-related transport system. Boarding aid 6" has a first tread element 10" as well as three second tread elements 11", with the tread elements 10", 11" interconnected to each other in a scissor like manner, creating steps which can be moved relative to each other into their stowed position. As before, the first tread element 10" can be swiveled relative to carrier 1' from the boarding position to the transport position as shown in FIG. 10 so that boarding aid 6" in its transport position also forms an obstacle for the animal in this embodiment.

The types of the boarding aids 6, 6', 6" from the figures are advantageous in that and their design allows an actuation with one hand, i.e. that it can be moved from the transport position to the boarding position and vice versa. This is advantage since the user or operator has one free hand to keep the animal, in particular a dog, on the leash or collar so that the animal cannot get into the road traffic without guidance.

To ensure single-hand control, the tread elements 10,11 of the boarding aid 6 from FIGS. 5 to 13 are of a light weight type. Every tread element consists of two top layers 13, 14 of a fiber-plastic composite as an upper and lower bowl. The fiber-plastic compound contains layers of aramid fibers and layers of carbon fibers. A foam and honeycomb structure is provided between each of the top layers 13, 14 as a core material. Such a design of the tread elements 10, 11 not only has the advantage of a low weight but simultaneously offers the required strength and stiffness so that the boarding aid does not require or requires only one floor space (as in the embodiment shown).

Since the plastic of both bowls 13, 14 reinforced by layers of aramid fibers and layers of carbon fibers have a very smooth and hard surface, it is not adequate for receiving an animal, in particular a dog. Therefore, the surface of the particular bowl element 13 has a rubber coating in its boarding position. This coat is of a non-slip type and is elastically deformable so that it can be trodden by a dog as well.

To enable an animal to leave or board motor vehicle 3, it is not only necessary for boarding aid 6 to be swiveled from its transport position to its boarding position, but the second tread element 11 must be capable of being swiveled at the same time relative to the first tread element 10 from a folded to an extended position as shown in FIG. 8. To control these two swiveling movements by one hand, boarding aid 6 provides a forced guidance system which comprises several mechanisms.

The side view in FIG. 8 clearly shows that pivot axis 12, which allows the swiveling of the first tread element 10 relative to the second tread element 11, is arranged in such a way that pivot axis 12 lies between tread element 10, 11 or between the planes defined by them in their folded and stowed condition in which the two tread elements 10, 11 are mainly run parallel to each other. This arrangement of pivot axis 12 reduces the forces required for unfolding the tread element 6 from the motor vehicle.

In addition, a handle element 15 is provided on boarding aid 6. The handle element 15 is mainly of a U-shape type, having a connection section 16 which forms the actual handle, and two legs 17, 18.

The first leg 17 of the handle element 15 is pivotably attached relative to the first tread element 10 on pivot axis 12 which ensures the swivability of the first tread element 10 relative to the second tread element 11 at the same time. As opposed to this, the second leg 18 of handle element 15 is rigidly arranged on the second tread element, i.e. it is not swiveled relative to the second tread element 11 when the first tread element 10 is swiveled. Now, if handle element 15 is seized for transferring boarding aid 6 from its transport position to its boarding position, the swiveling of the first tread element 10 relative to carrier 1' driven by handle element 15 only causes a simultaneous swiveling of the second element 11 relative to the first tread element 10 from its folded to its extended position.

In addition, boarding aid 6 has a stand 19 which is attached to it and be can be swiveled around a pivot axis 20 relative to the second tread element 11. Stand 19 is designed to absorb additional forces and moments occurring when the tread elements 10, 11 are trodden by an animal, and to discharge them to the ground despite of the sufficient strength of tread elements 10,11. Stand 19 is preloaded in its unfolded position as shown in FIG. 8 by means of a gas pressure spring 21 which supports itself on the second tread element 11 and stand 19. Therefore, stand 19 is in the unfolded position when no force is applied.

To swivel the stand 19 against the force of spring 21 from its unfolded position as shown in FIG. 8 to its folded position in which stand 19 is substantially parallel to the second tread element 11 and between the first tread element 10 and the second tread element 11, a force must swivel stand 19 against the force of spring 21. The design required for that is shown again in the bottom view of the boarding aid 6 in FIG. 12.

A Bowden cable 22 is used for coupling the swiveling movement of stand 19 relative to the second tread element coupled to the swiveling movement of the second tread element 11 relative to the first tread element 10. To this effect, a small roll 23 which does not rotate relative to the first tread element 10 is concentrically provided for the pivot axis 12 between the first tread element 10 and second tread element 11. The first end of the Bowden cable 22 is attached to roll 23. A second large roll 24 is again concentrically attached around pivot axis 20 of stand 19. This roll 24 is non-rotatable relative to stand 19, with the large roll 24 being bigger than the small roll 23 to ensure a transmission ratio. The second end of the Bowden cable 22 is again attached to the large roll 24. The swiveling of the second tread element 11 relative to the first tread element 10 now causes a tension of the small roll 23 to the first end of Bowden cable 22, which is transferred to the second end of Bowden cable 22 and applies a torque to the large roll 24. A turn of the large roll 24 then causes stand 19 to be folded against the spring force of gas pressure spring 21. In this way, stand 19 is folded when the boarding aid is swiveled from its boarding position to its transport position, with the second tread element 11 also swiveling relative to the first tread element 10 from its extended position from its folded position.

Furthermore, the preload of stand 19 by gas pressure spring 21 in the unfolded position causes the force of gas pressure spring 21 to support the movement of boarding aid 6 from its transport position to its boarding position, reducing the required efforts to be made by the user.

Figure 13:
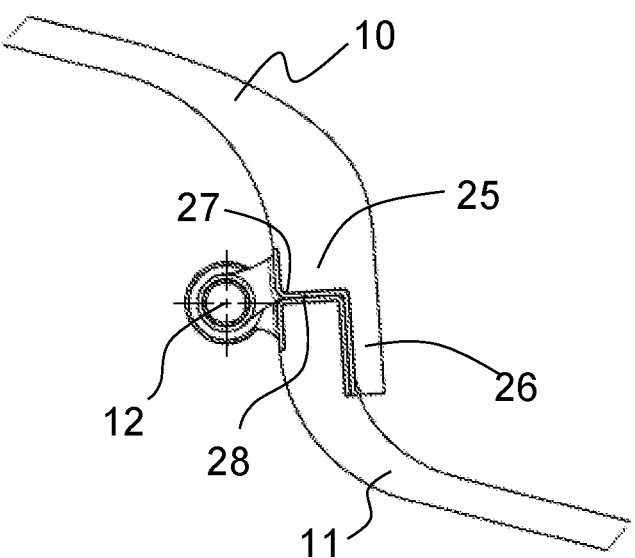
FIG. 13 is an enlarged and partially cross section through the pivot axis of the boarding aid from FIGS. 5 to 8, 11 and 12.

FIG. 13 shows a cross-section through pivot axis 12 between the first tread element 10 and the second tread element 11, with this cross-section illustrating the design of the stop area between both tread elements 10, 11. The first tread element 10 has an L-shape on its end facing the second tread element 11, with the two legs 25, 26 of the first tread element 10 clasping the end of the second tread element 11 facing the first tread element 10 so that this L-shaped end forms a stop for the swiveling movement between both tread elements 10, 11. For example, this stop prevents the bending or puncturing of the tread elements 10, 11 when they are extended or loaded.

Furthermore, the cross-section from FIG. 13 shows how the metallic fastening sections 27, 28 of the two tread elements 10, 11 are integrated into the composite material of the tread elements 10, 11. Here, one of the two fastening sections, i.e. the second tread element 11, is rotatably supported by rotation axis 12, while the fastening section 27 of the first tread element 10 also keeps rotation axis non-rotatable relative to the first tread element 10. In this way it is possible to mount the small roll 23 rotatably on rotation axis 12 and thus non-rotatably relative to the first tread element 10.

As described above, boarding aid 6 forms an obstacle in the transport position, preventing an animal from exiting the transport surface of the motor vehicle. To this effect, boarding aid 6 and a side wall of a transport space panel are provided with complementary catch elements for locking a tread element in its transport position.

Figure 12:
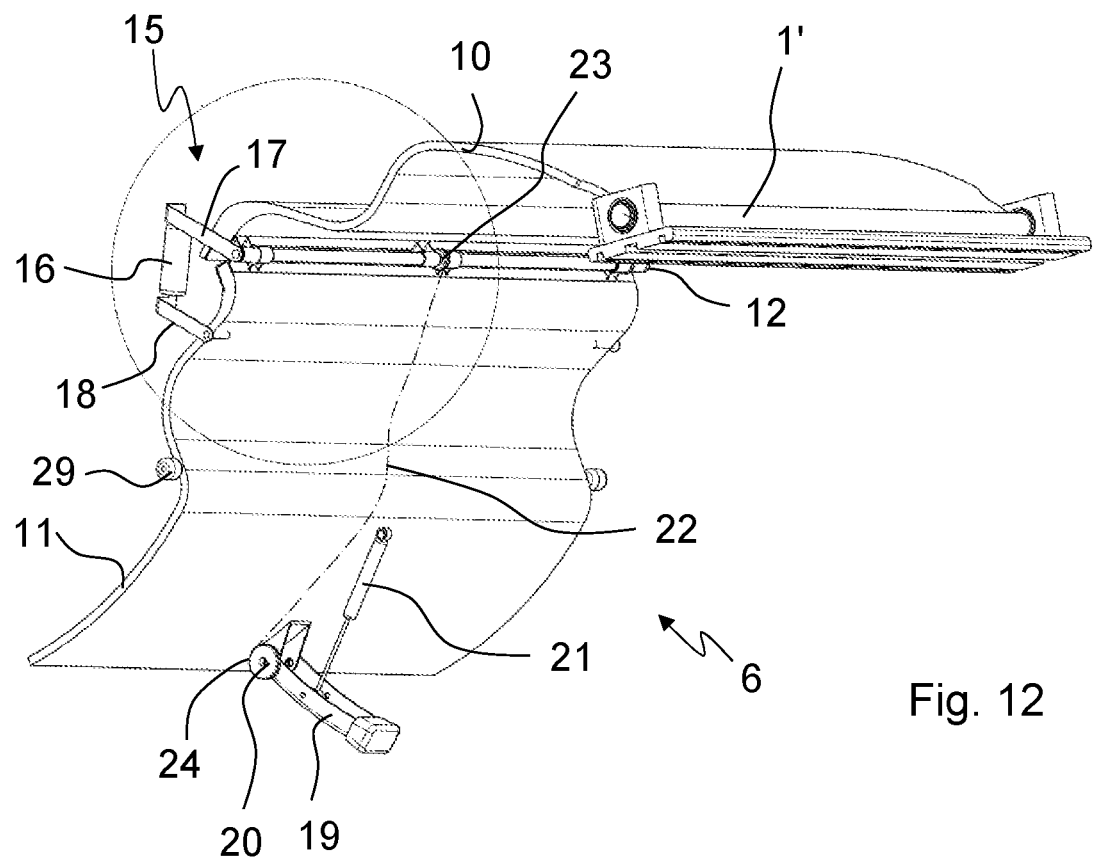
FIG. 12 is a partial isometric bottom view of the boarding aid from FIGS. 5 to 8 and 11.
Figure 14:
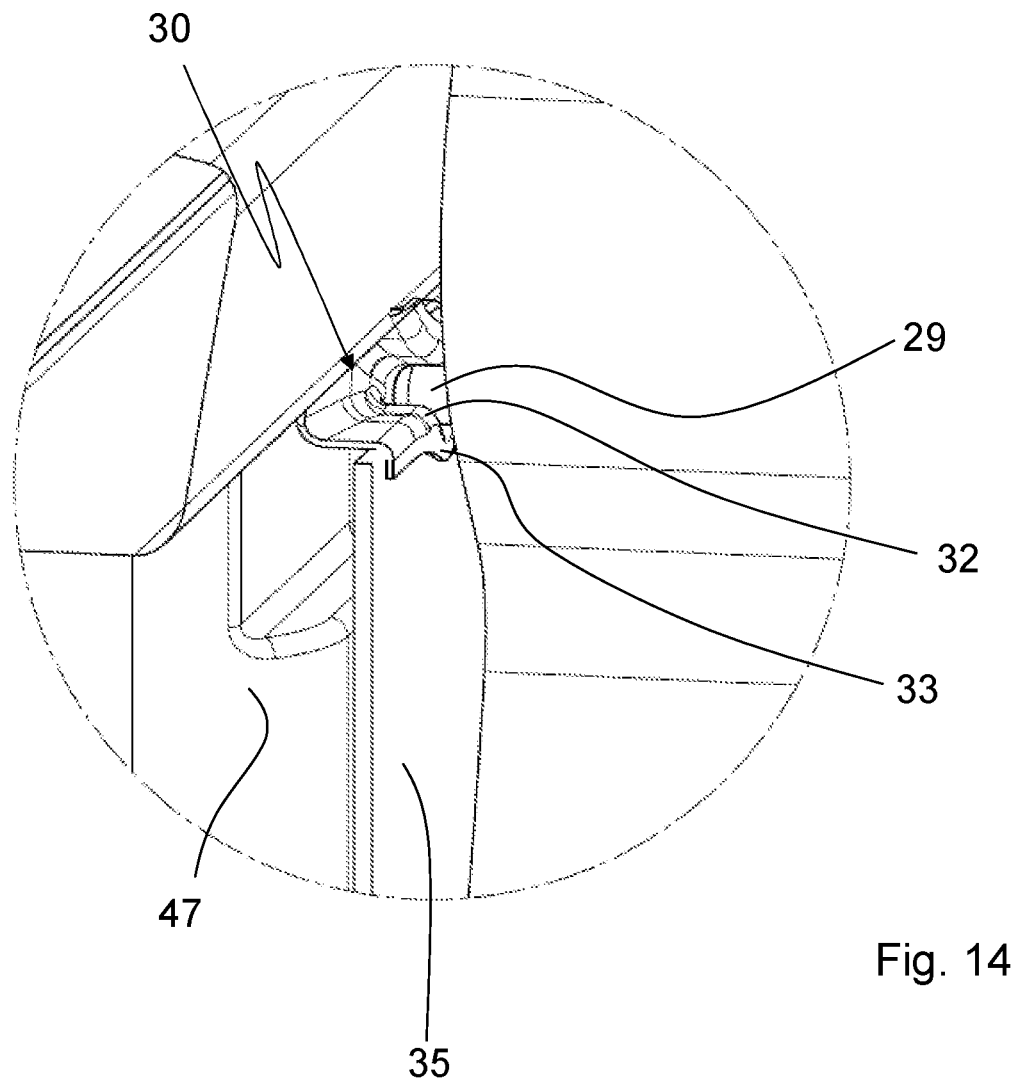
FIG. 14 is an enlarged and partially isometric view of the locking mechanism of the boarding aid from FIGS. 5 to 8 as well as 11 to 13.
Figure 15:
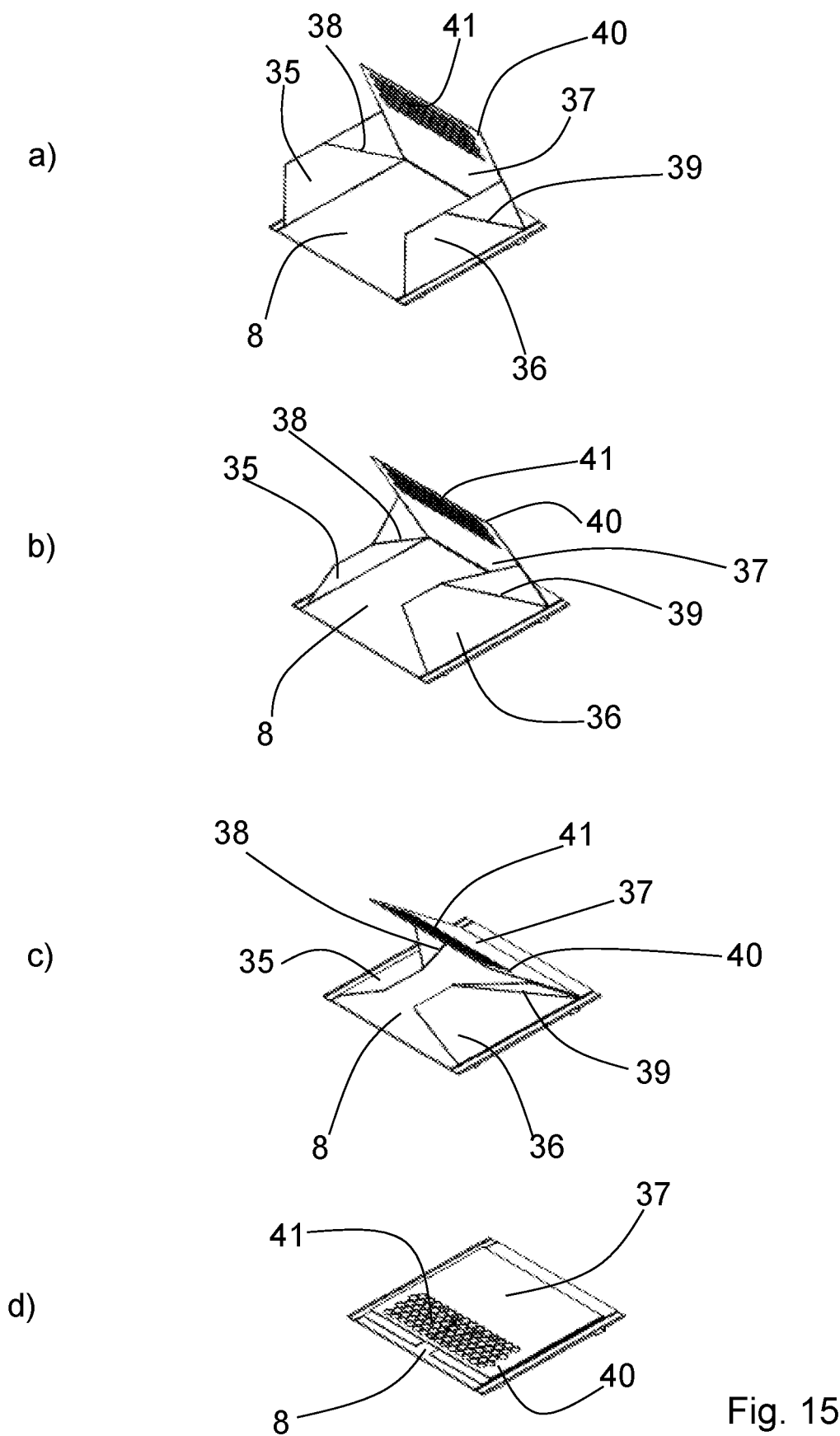
FIGS. 15a to 15d are chronological views of a trunk lining when folded.
Figure 16:
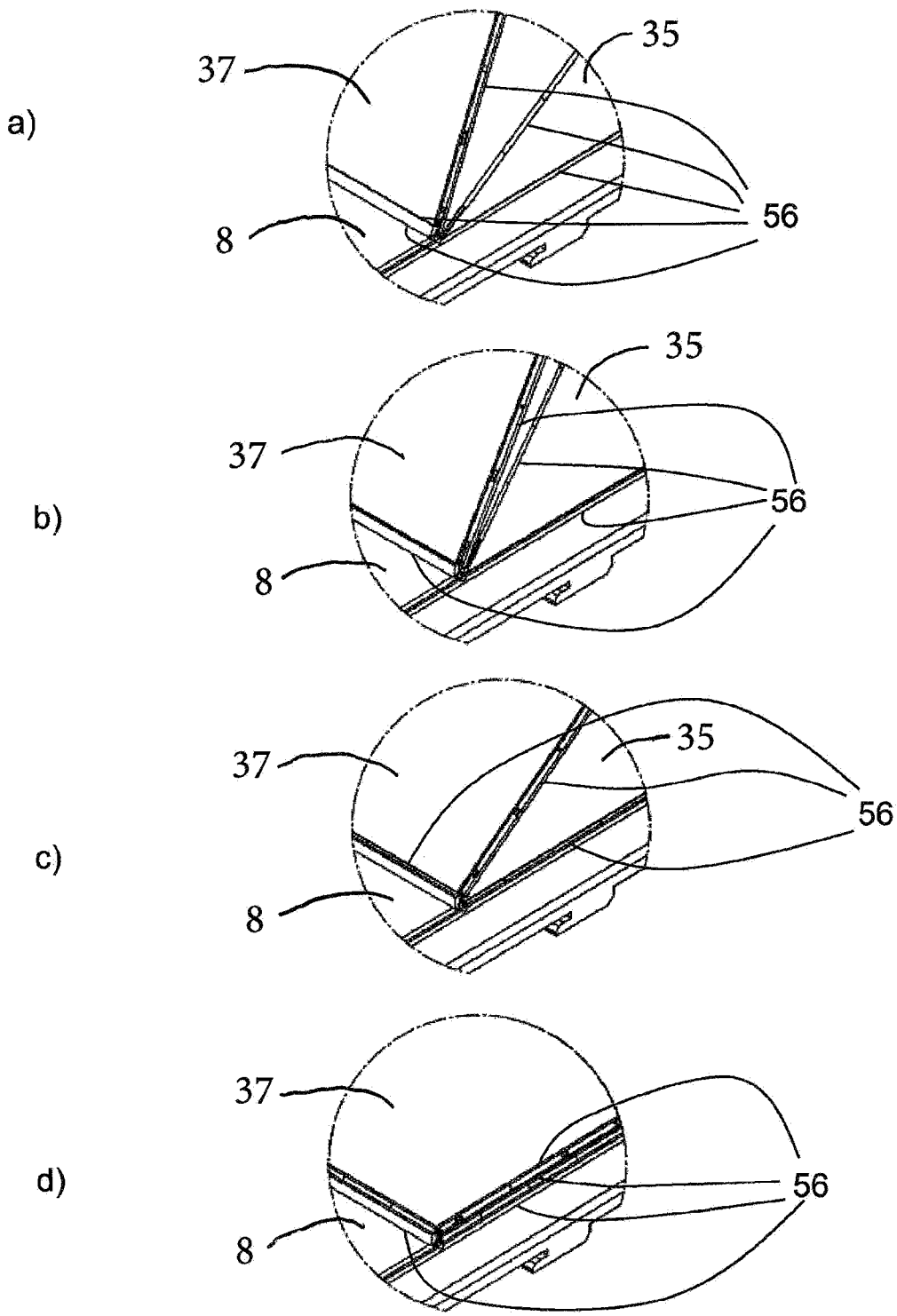
FIGS. 16a-16d are enlarged and partially isometric views of the pivot axes of the trunk lining from FIGS. 15a to 15d.
Figure 17:
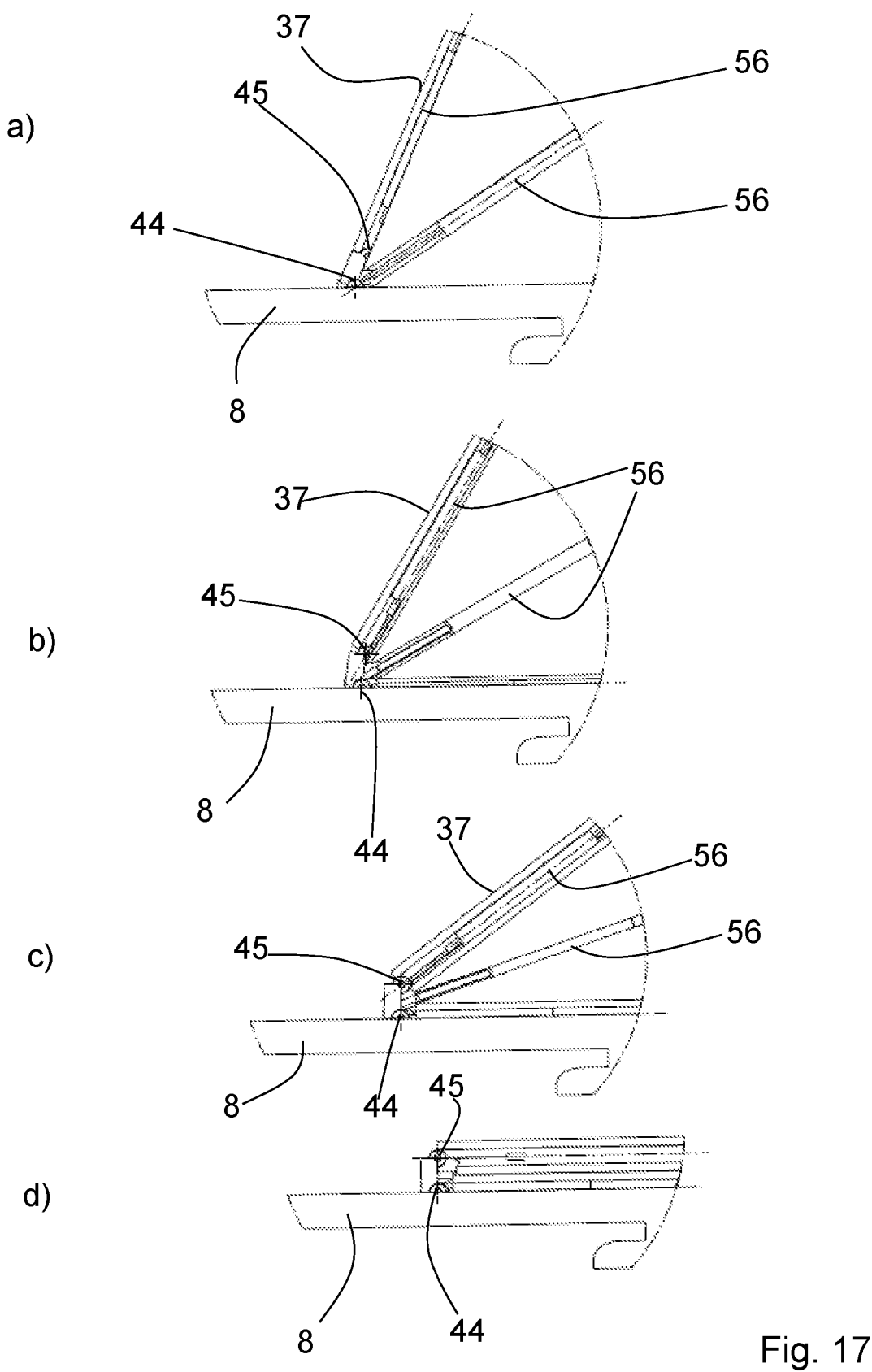
FIGS. 17a-17d are side views of the pivot axes of the trunk lining from FIGS. 15a to 15d and 16a to 16d.

The catch element of boarding aid 6 can well be identified as a journal 29 in FIG. 12. FIG. 14 shows the interaction of this journal 29 with the complementary catch device 30 on side wall 35 of the trunk lining. Catch 30 consists of a link guide with a catch nose 32. Folding boarding aid 6 into its transport position causes the journal 29 to run into a catch recess 33 via catch nose 32.

While the transport system with its boarding aid 6, as described before, allows a simple boarding and exiting of a pet, there are requirements for a transport system to be met for an animal in a motor vehicle. In particular, this includes the protections of the transport area, in particular the trunk or the rear bench of the motor vehicle, from the animal's behavior such as scratching or biting or fouling. In addition, the passengers and the animal must be protected in case of a collision of the motor vehicle with an obstacle. To this effect, one type of the transport system with a boarding aid has a transport space lining. Such a transport space lining may also be a separate invention, i.e. without the boarding aid.

FIGS. 15a to 15d, 16a to 16d and 17a to 17d show a type of such a transport space lining, here a trunk lining rigidly connected by two carriers as shown in FIG. 1 to the loading space rails of the trunk. To ensure that the trunk lining can be handled, it can be folded. The trunk lining of the type from FIGS. 15 to 17 consists of a floor 8, two side walls 35, 36 and a rear wall 37.

At least the rear wall 37, but preferably the side walls 35, 36 as well, are made of layers of plastic reinforced with aramid fibers and carbon fibers so that they are highly impact proof. In case of a head on collision of the motor vehicle this prevents the animal from breaking through rear wall 37 because of its mass and entering the passenger area. Due to the high impact strength of the selected material. The force of the animal exerted in case of headon collision to rear wall 37 is distributed to an area which is larger than the actual contact surface between the animal and rear wall 37. It goes without saying that this concept also works for the side walls 35, 36 in case of a side impact.

To ensure the foldability of the side walls 35, 36, they are split along lines 38, 39, each at an angle to the side edges. The two sections of each side wall 35, 36 thus created can be swiveled relative to each other by the pivot axes. Also, the swivability around particular pivot axes is possible between the following elements: each of the side walls 35, 36 relative to floor 8, each of the side walls 35,36 relative to the rear wall 37 and rear wall 37 relative to floor 8, which means a total of eight swivels are implemented.

Refer to the consecutive FIGS. 15a to 15d, 16a to 16d as well as 17a to 17d for the foldability of the side walls 35, 36 and rear wall 37 relative to floor 8 resulting from the arrangement of the pivot axes.

Figure 18:
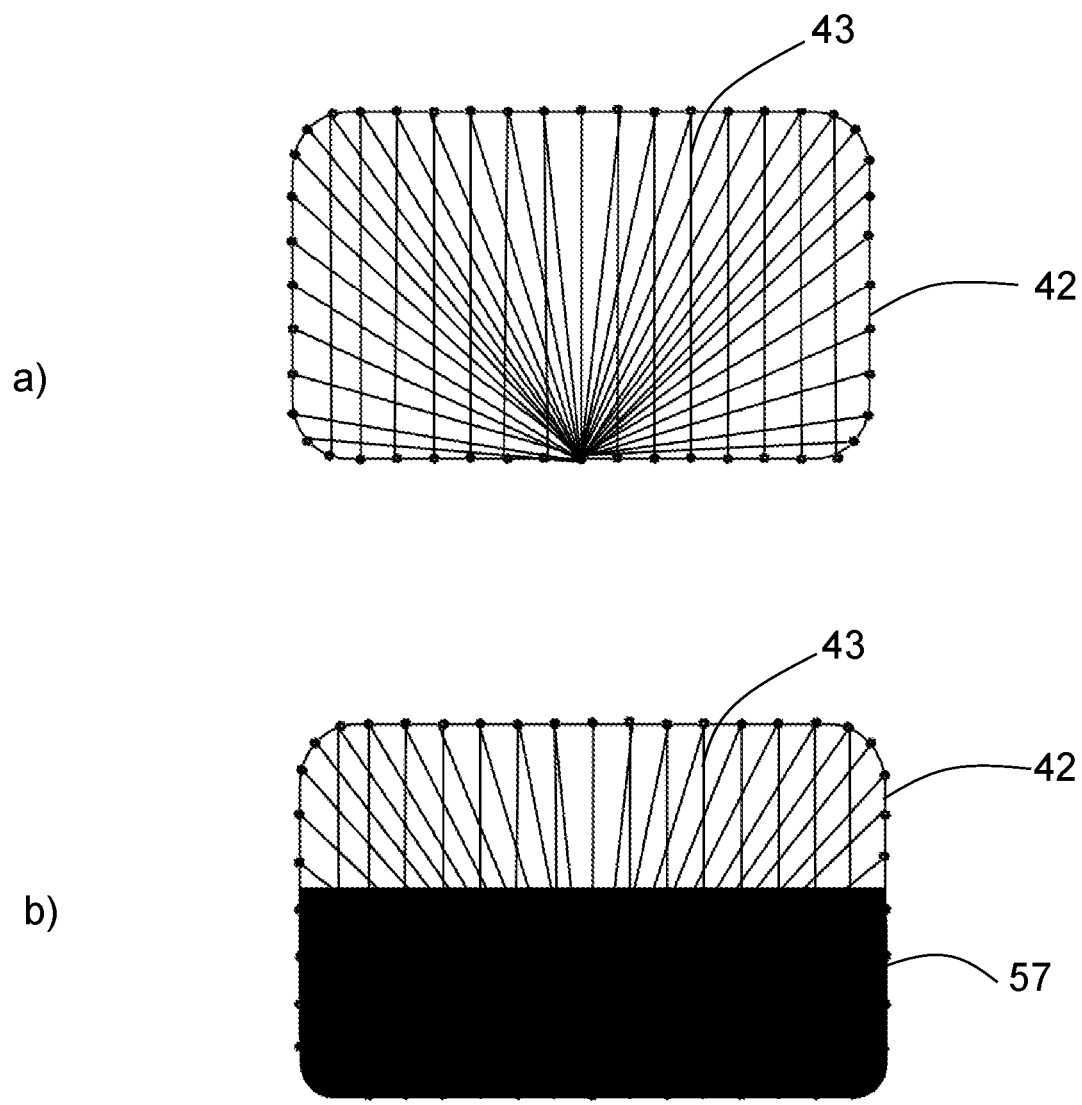
FIGS. 18a and 18b are schematics of the production processes for the rear wall of the trunk lining from FIGS. 15a to 15d, 16a to 16d and 17a to 17d.

Rear wall 37 significantly exceeds the height of the side walls 35, 36 and is provided with penetrations 41 in the fiber-plastic compound in the upper section 40, allowing a view from the passenger area into the transport area of the motor vehicle. These penetrations 41 can directly be provided during the production of the fiber reinforced plastic material of rear wall 37. This is exemplarily shown in FIGS. 18a and 18b. The filaments of the carbon and aramid fibers 43 are wrapped around a frame 42 and are provided with top layers 57 in the lower area.

The foldability of side walls 35, 36, 37 and rear wall 37 relative to floor 8 requires, due to the rigid but force distributing material of the walls 35, 36, 37, a design based accurate play of the individual elements to each other. As shown in FIGS. 16a to 16d, the hinges along the pivot axes between the individual elements are of the turn-slide cylindric joint type 56.

Furthermore, the swiveling movement of the rear panel 37 relative to floor 8 is equipped with a double hinge with two revoluted joints 44, 45 having a distance to each other. FIGS. 17a to 17d show this double hinge 44,45. Swiveling the first revoluted joint 44 causes a displacement of the position of the second revoluted joint 45 and thus a displacement of the swiveling axis for the folding movement of rear wall 37.

The distribution of the forces to a surface which is larger than the impact surface of an animal to the rear wall 37 of the trunk lining has been described before. The safe accommodation of the animal which reduces the probability of an injury in case of a head on collision or a side impact requires an absorption of the acting energy beyond a distribution of forces and thus the energy. To this effect, a type of the transport system has an energy absorption element 46, which can either be a separate invention or the energy absorption element 46 itself is the transport system, or the energy absorption element 46 is part of a transport system with a trunk or transport space lining, as described before, with an optional addition of a boarding aid.

Figure 19:
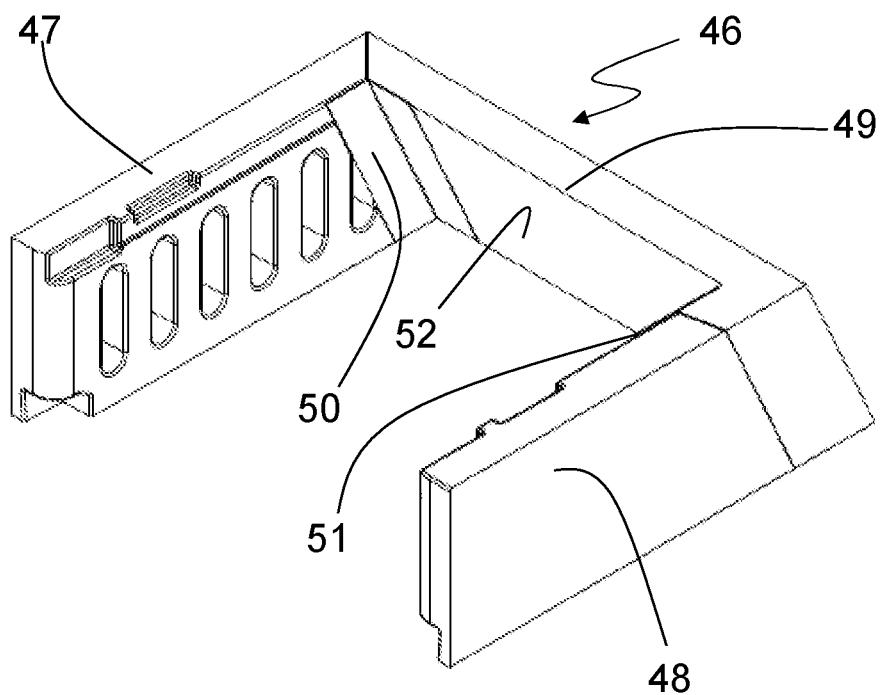
FIG. 19 is a schematic of an energy absorption element according to an embodiment of the present invention.
Figure 20:
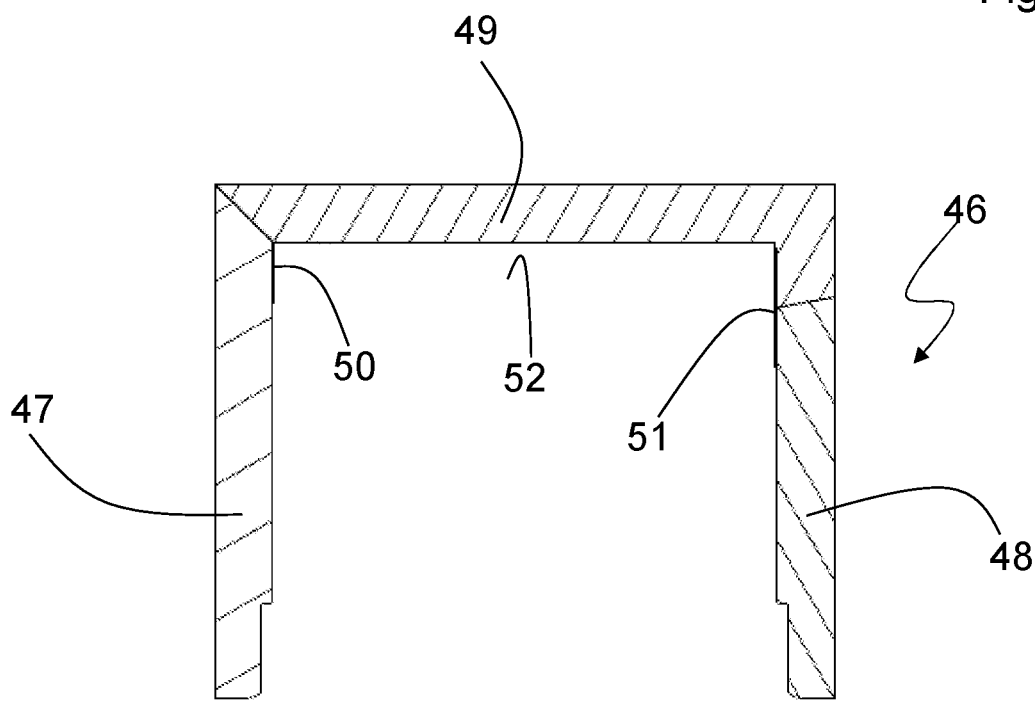
FIG. 20 is a horizontal cross-section of the energy absorption element from FIG. 19

FIG. 19 shows a type of such an energy absorption element 46 with two side elements 47, 48 as well as a rear element 49.

The energy absorption element 46 of this type consists of a plastically deformable polyurethane foam which dissipates the kinetic energy which is passed into the energy absorption element in case of plastic deformation. To improve the capability of the material of the energy absorption element 46 for the absorbing of energy, it has recesses in side elements 47, 48 as well as the rear element 49. If the animal strikes the energy absorption element 46, this material can be deformed such that it escapes into the recesses.

The rear element 49 and the two side elements 47, 48 are designed such that they can be swiveled relative to each other. The swivelability is realized by a foil hinge 50, 51 between each side element 47, 48 and rear element 49. In this case, the pivot axes of the foil hinges 50, 51 have a different distance to surface 52 of rear element 49. In this way the side elements 47, 48 as well as the rear element 49 can be folded on top of each other in a parallel fashion, reducing the packing dimension.

Figure 21:
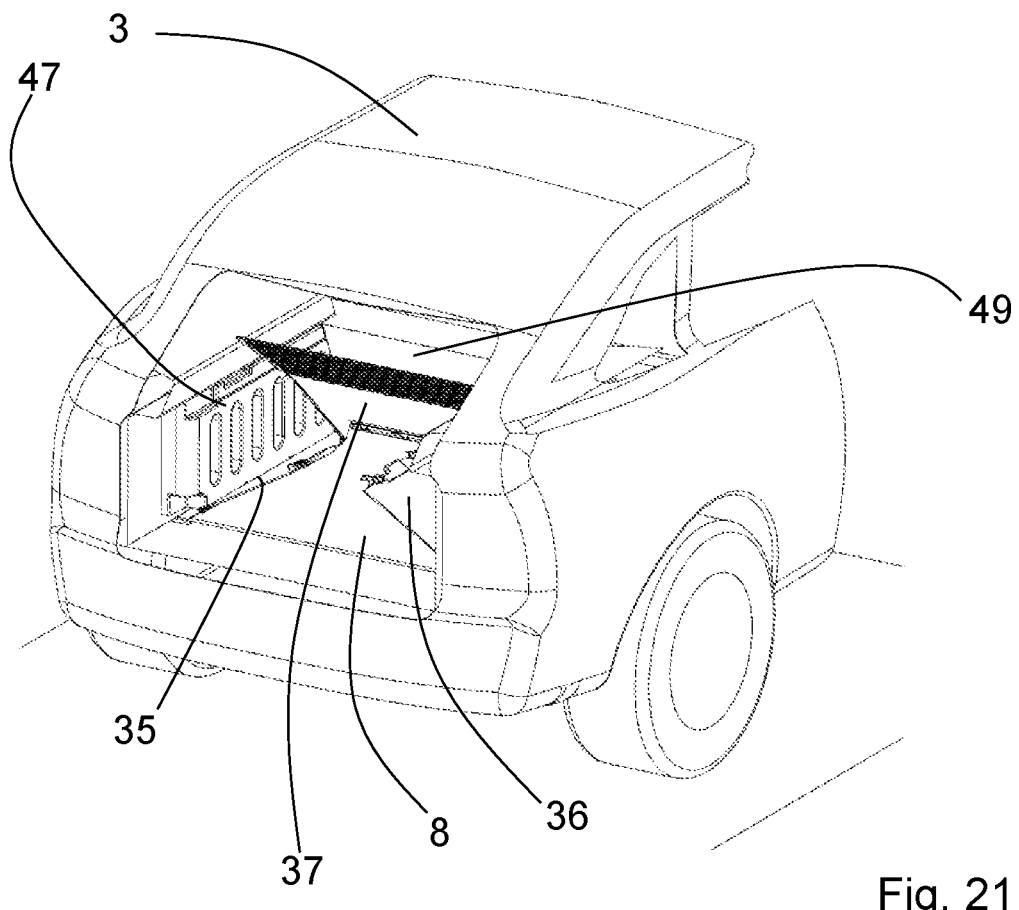
FIG. 21 is a partial isometric view of the motor vehicle with its energy absorption element from FIGS. 19 and 20 as well as the trunk lining from FIGS. 15 to 17.

In a type where the energy absorption element 46 is part of the transport system with a transport space and trunk lining, the energy absorption element 46 is arranged between the side walls or the wheelhouses of the trunk and side walls 35, 36 of the trunk lining as well as between the rear bench and the rear wall 37 of the trunk lining. FIG. 21 shows such an arrangement. A combination of the highly impact proof side walls 35, 36 or the rear wall 37 as well as the energy absorbing energy absorption element 46 creates a design which ensures a high degree of freedom from injuries of an animal received in the trunk of motor vehicle 3 even during an accident. The frictional connection of the energy absorption element 46 indirectly above floor 8 of the trunk lining by carrier 1" is implemented by means of a magnetic lock (not shown in the drawing. To this effect, a permanent magnetic tape is connected to the energy absorption element 46 and meshed with floor 8 of the trunk lining.

Figure 22:
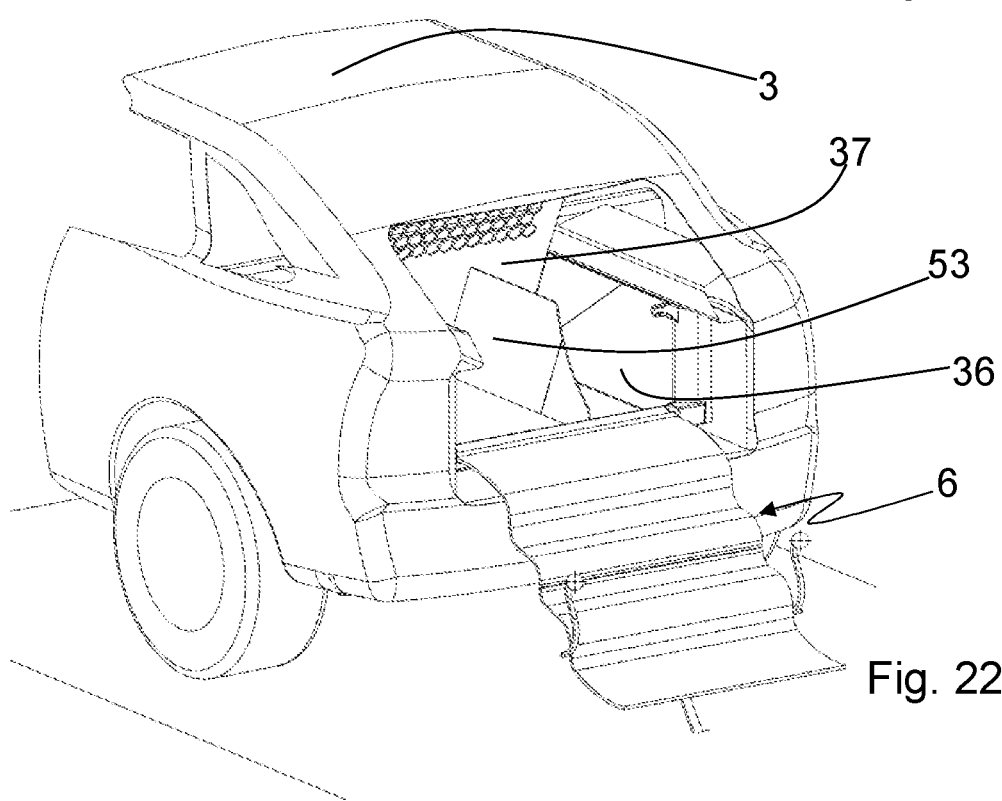
FIG. 22 is a partial isometric view of a transport system according to an embodiment of the present invention with a foldable partition wall.
Figure 23:
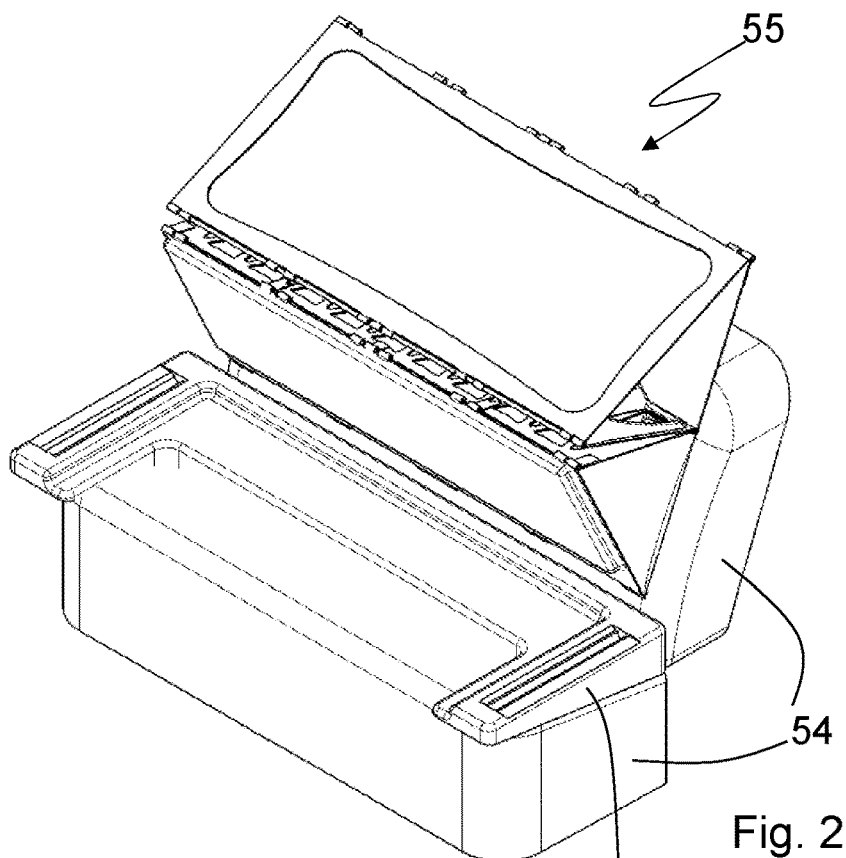
FIG. 23 is an isometric view of another version of the transport system of the invention-related transport system, received on the rear seat bench of a motor vehicle.
Figure 24:
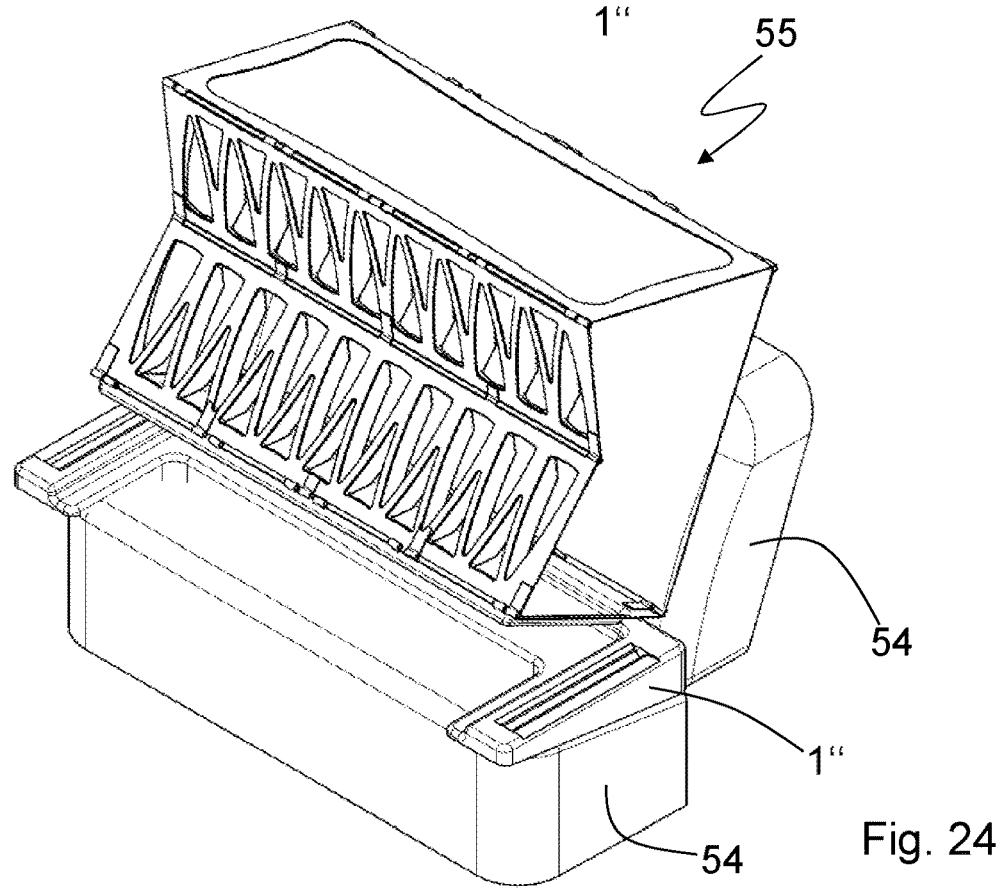
FIG. 24 is an isometric view of the transport system from FIG. 23 while the interior lining is unfolded.
Figure 25:
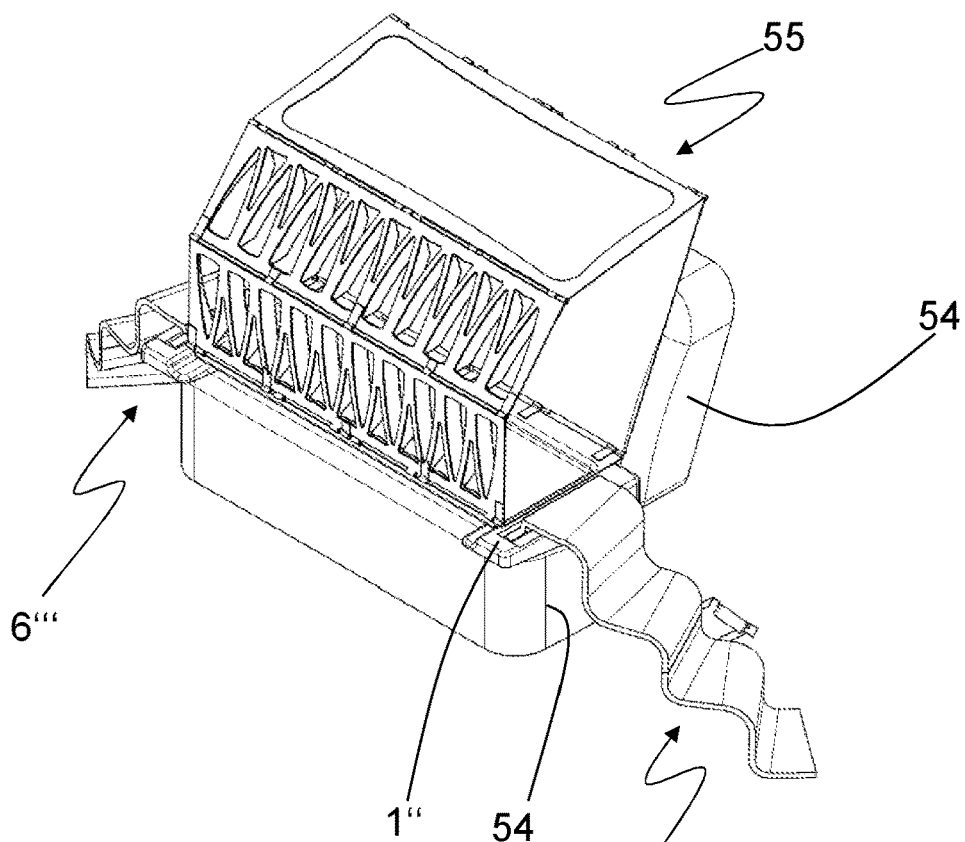
FIG. 25 is an isometric view of the transport system from FIGS. 23 and 24 with two installed boarding aids in their boarding position.
Figure 26:
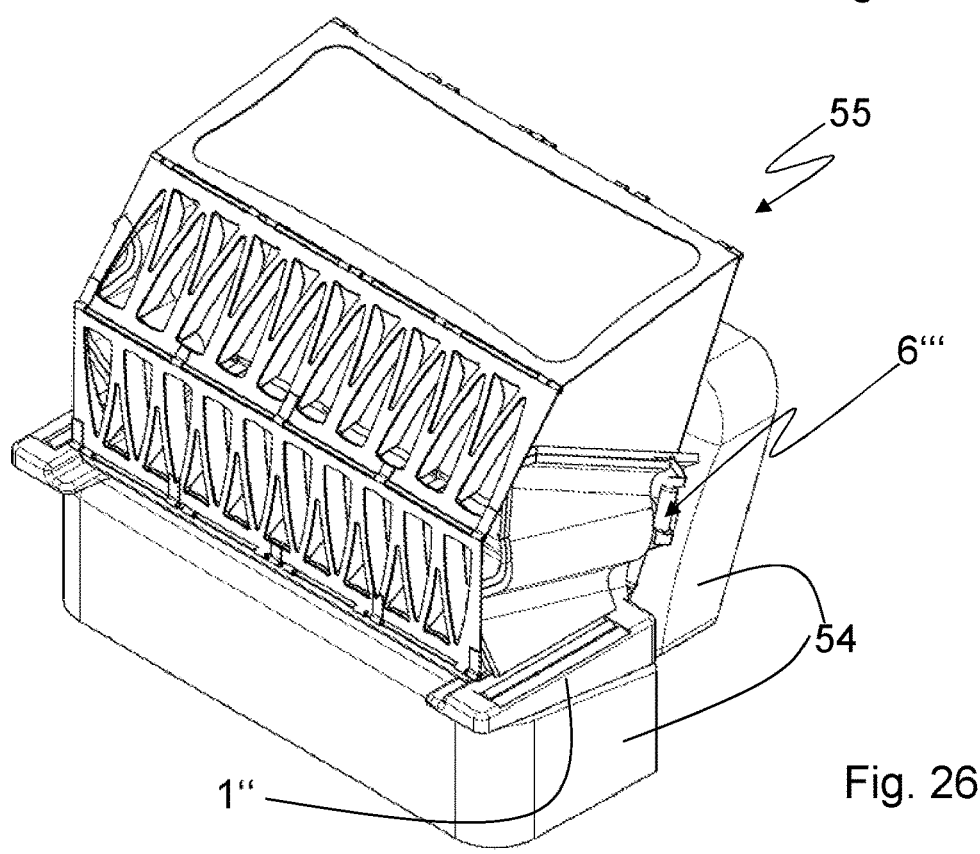
FIG. 26 is an isometric view of the transport system from FIG. 25 with its boarding aids in their transport position.

FIG. 22 shows a type of the transport system where a trunk lining has a partition wall 53 which is attached in a swivelable manner relative to the rear panel 37. Such a partition wall 53 ensures a separate reception of two animals in the trunk or the provision of a luggage compartment separate from the transport area for the animal.

FIGS. 23 to 26 show an alternative type of the invention-related transport system, received on a rear seat bench 54 of the motor vehicle. Carrier 1" in this type is molded plastic part with two lockable fastening hooks which engage into the Isofix sections of rear seat bench 54.

As described before for the types of the transport system for the reception in the trunk of the motor vehicle, a type as shown in FIGS. 23 to 26 is a transport space lining, here a foldable interior lining 55, as well as two boarding aids 6''' frictionally connected to carrier 1". As shown in the consecutive FIGS. 23 to 25, the interior space lining 55 can be folded, and the interior space lining 55 can be taken through the side opening of the motor vehicle in its folded or un folded position from FIG. 23 and can then be unfolded on the rear seat bench until the interior space lining 55 has reached its maximum interior volume for receiving the animal (refer to FIGS. 23 and 24). The two boarding aids 6''' allow the boarding and exiting of an animal in the transport area through the side doors of the motor vehicle. Apart from the bent or coiled shape, the design of the boarding aids 6''' is identical to the design of boarding aid 6, as e.g. described by FIG. 8 before.

For the purposes of the original disclosure, please note that all features which an expert can infer from the present description, the drawings and the claims, even if they were exactly described only in connection with certain other features, can be combined both individually and in any compositions with other features or feature groups disclosed here, unless this is otherwise expressly excluded or technical facts make such a combination impossible or senseless. An overall explicit description of all conceivable feature combinations is waived here for the sake of brevity and readability of the description.

While the invention is detailed in the drawings and previous description, this representation and description can only be intended as an example and not as a restriction of the protection scope, and is defined by the claims. The invention is not limited to the disclosed embodiments.

Variations of the disclosed embodiments are obvious for the expert from the drawings, the description and the enclosed claims. In the claims the word "have" does not exclude other elements or steps, and the indefinite article "a" and "an" do not exclude a plural. The mere fact that certain features are claimed in different claims does not rule out their combination. Drawing references in the claims are not intended as limitation of the scope of protection.

Other advantages, features and possible applications of the present invention can be referred to in the description of an embodiment and the pertaining figures. Same elements are identified by the same drawing references in the figures.

Same elements are identified by the same references in the figures.

The invention claimed is:

1. A motor vehicle, comprising:
   a transport surface;
   a door;
   a hatchback or a platform gate; and
   a transport system for an animal, wherein the transport system comprises:
   a carrier received on the transport surface of the motor vehicle; and
   a boarding aid comprising a first tread element and at least a second tread element, the first tread element swivelably attached to the carrier, wherein the boarding aid is movable from a transport position to a boarding position;
   wherein the boarding aid is arranged in the transport position on a first side of a plane defined by the carrier, and the boarding aid is an obstacle for the animal;
   wherein the boarding aid arranged in the boarding position on a second side of the plane defined by the carrier and the animal is able leave the motor vehicle via the boarding aid;
   wherein the first tread element and the second tread element are moveable relative to each other between an extended condition and a stowed condition;
   wherein swiveling of the boarding aid relative to the carrier from the transport position to the boarding position provides a movement of the first tread element relative to the second tread element from the stowed condition to the extended condition;
   wherein the first tread element and the second tread element are configured to be swiveled between the extended condition and a folded condition, and swiveling of the boarding aid relative to the carrier from the transport position to the boarding position provides a swiveling of the first tread element relative to the second tread element from the folded condition to the extended condition; and wherein the boarding aid comprises a stand pivotably attached to the second tread element and movable from an unfolded to a folded position, the stand extending substantially parallel to the second tread element in the folded position and the stand coupled to at least one element selected from a group consisting of the first tread element and the second tread element by a Bowden cable, wherein swiveling of the first tread element and the second tread element relative to each other provides a swiveling movement of the stand.

2. The motor vehicle of claim 1, wherein:
the boarding aid defines a pivot axis around which the first tread element swivels relative to the second tread element, and the boarding aid comprises a handle element rigidly attached to the second tread element, the handle element is pivotably attached to the pivot axis relative to the first tread element.

3. The motor vehicle of claim 2, wherein:
the pivot axis is arranged in a folded condition of the first tread element and the second tread element in a plane between the first tread element and second tread element.

4. The motor vehicle of claim 1, further comprising:
a handle comprising a U-shaped handle element connected to a first leg, a second leg and a connection section connecting the first and the second leg, the first leg pivotably attached relative to the first tread element on a pivot axis, and the second leg rigidly connected to the second tread element.

5. The motor vehicle of claim 1, wherein:
at least one element selected from a group consisting of the first tread element and the second tread element is made of a composite fiber material.

6. The motor vehicle of claim 1, wherein:
the carrier comprises a fastening device for connection to a reception of the motor vehicle, which reception is complementary to the fastening device.

7. The motor vehicle of claim 1, wherein:
the transport system comprises a rear wall facing the boarding aid and comprises two side walls, the rear wall and the side walls movable relative to the carrier.

8. The motor vehicle of claim 7, wherein:
the rear wall is pivotably connected to each of the side walls each along an edge of the rear wall, every side wall comprising at least two sections swivelable relative to each other, wherein the rear wall and the side walls are swivelable relative to each other and to the carrier and are configured to be moved to deposited position on the carrier.

9. The motor vehicle of claim 8, wherein:
the sections of the side walls and the rear wall each are pivotable around pivot axes using turn-slide cylindric joints, pivoting of the sections of the side walls and the rear wall providing a translatory movement of the sections of the side walls and the rear wall relative to the pivot axes, the pivoting providing a combined translatory motion and swiveling of the sections of the side walls and the rear wall relative to each other.

10. The motor vehicle of claim 7, wherein:
the rear wall is pivotable by a combination of a first hinge joint and a second hinge joint relative to the carrier, wherein a swiveling of the first hinge joint effects a displacement of a position of the second hinge joint.

11. The motor vehicle of claim 7, further comprising:
an energy absorption element meshed with a surface of the rear wall pointing away from the boarding aid.

12. The motor vehicle of claim 1, wherein:
the carrier is positively connected to a loading-space rail or a lashing eyelet disposed in a rear portion of the motor vehicle.

13. A transport system for an animal to be received in a motor vehicle, comprising:
a carrier configured to be received on a transport surface of the motor vehicle; and
a boarding aid comprising a first tread element and at least a second tread element, the first tread element swivelably attached to the carrier, wherein the boarding aid is movable from a transport position to a boarding position;
wherein the boarding aid is arranged in the transport position on a first side of a plane defined by the carrier, and the boarding aid is an obstacle for the animal after the transport system has been received in the motor vehicle;
wherein the boarding aid arranged in the boarding position on a second side of the plane defined by the carrier and the animal is able leave the motor vehicle via the boarding aid;
wherein the first tread element and the second tread element are moveable relative to each other between an extended condition and a stowed condition;
wherein swiveling of the boarding aid relative to the carrier from the transport position to the boarding position provides a movement of the first tread element relative to the second tread element from the stowed condition to the extended condition; and
wherein the boarding aid defines a pivot axis around which the first tread element swivels relative to the second tread element, and the boarding aid comprises a handle element rigidly attached to the second tread element, the handle element is pivotably attached to the pivot axis relative to the first tread element.

14. The transport system of claim 13, wherein:
the pivot axis is arranged in a folded condition of the first tread element and the second tread element in a plane between the first tread element and second tread element.

15. A transport system for an animal to be received in a motor vehicle, comprising:
a carrier configured to be received on a transport surface of the motor vehicle; and
a boarding aid comprising a first tread element and at least a second tread element, the first tread element swivelably attached to the carrier, wherein the boarding aid is movable from a transport position to a boarding position;
a handle comprising a U-shaped handle element connected to a first leg, a second leg and a connection section connecting the first and the second leg, the first leg pivotably attached relative to the first tread element on a pivot axis, and the second leg rigidly connected to the second tread element;
wherein the boarding aid is arranged in the transport position on a first side of a plane defined by the carrier, and the boarding aid is an obstacle for the animal after the transport system has been received in the motor vehicle;
wherein the boarding aid arranged in the boarding position on a second side of the plane defined by the carrier and the animal is able leave the motor vehicle via the boarding aid;

wherein the first tread element and the second tread element are moveable relative to each other between an extended condition and a stowed condition; and wherein swiveling of the boarding aid relative to the carrier from the transport position to the boarding position provides a movement of the first tread element relative to the second tread element from the stowed condition to the extended condition.

16. A transport system for an animal to be received in a motor vehicle, comprising:

a carrier configured to be received on a transport surface of the motor vehicle; and a boarding aid comprising a first tread element and at least a second tread element, the first tread element swivelably attached to the carrier, wherein the boarding aid is movable from a transport position to a boarding position;

wherein the boarding aid is arranged in the transport position on a first side of a plane defined by the carrier, and the boarding aid is an obstacle for the animal after the transport system has been received in the motor vehicle;

wherein the boarding aid is configured to be arranged in the boarding position on a second side of the plane defined by the carrier and the animal is able to leave the motor vehicle via the boarding aid when the boarding aid is in the boarding position;

wherein the first tread element and the second tread element are moveable relative to each other between an extended condition and a stowed condition;

wherein swiveling of the boarding aid relative to the carrier from the transport position to the boarding position provides a movement of the first tread element relative to the second tread element from the stowed condition to the extended condition;

wherein the boarding aid comprises a stand pivotably attached to the second tread element and movable from an unfolded to a folded position, the stand extending substantially parallel to the second tread element in the folded position and the stand coupled to the first tread element by a Bowden cable, wherein swiveling of the first tread element and the second tread element relative to each other provides a swiveling movement of the stand; and wherein the stand is preloaded by a spring relative to the second tread element into the folded position, wherein the stand is configured for a first force to be applied against a second force of the spring when the boarding aid is moved from the transport position to the boarding position.

* * * * *